US009746651B2

(12) United States Patent
Zhao et al.

(10) Patent No.: US 9,746,651 B2
(45) Date of Patent: Aug. 29, 2017

(54) ZOOM LENS SYSTEM AND CAMERA SYSTEM

(71) Applicant: Panasonic Intellectual Property Management Co., Ltd., Osaka (JP)

(72) Inventors: Qinghua Zhao, Kyoto (JP); Yoshiyuki Hisatomi, Shiga (JP); Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/070,375

(22) Filed: Mar. 15, 2016

(65) Prior Publication Data

US 2016/0274342 A1    Sep. 22, 2016

(30) Foreign Application Priority Data

Mar. 16, 2015  (JP) ................................ 2015-051571
Dec. 21, 2015  (JP) ................................ 2015-248155

(51) Int. Cl.
  *G02B 15/15*   (2006.01)
  *G02B 15/173*  (2006.01)
  *G02B 27/00*   (2006.01)

(52) U.S. Cl.
  CPC ....... *G02B 15/173* (2013.01); *G02B 27/0025* (2013.01)

(58) Field of Classification Search
  CPC ........................... G02B 15/173; G02B 27/0025
  USPC .................................................. 359/684, 682
  See application file for complete search history.

(56) References Cited

U.S. PATENT DOCUMENTS

| 4,560,254 | A | 12/1985 | Doi et al. |
| 5,561,560 | A | 10/1996 | Tsutsumi |
| 2002/0018297 | A1 | 2/2002 | Usui et al. |
| 2012/0075716 | A1* | 3/2012 | Kon ..................... G02B 15/173 359/684 |
| 2013/0222923 | A1 | 8/2013 | Wei |
| 2013/0242184 | A1 | 9/2013 | Matsumura |

FOREIGN PATENT DOCUMENTS

| JP | 59-212814 | 12/1984 |
| JP | H07-248449 A | 9/1995 |
| JP | 2001-356271 A | 12/2001 |

(Continued)

*Primary Examiner* — Alicia M Harrington
(74) *Attorney, Agent, or Firm* — McDermott Will & Emery LLP

(57) ABSTRACT

A zoom lens system according to the present disclosure includes, in order from an object side to an image plane side, a first lens group having positive optical power; a second lens group having negative optical power; a third lens group having positive optical power; and a subsequent lens group including a fourth lens group, a fifth lens group, and a sixth lens group. The first lens group comprises, in order from the object side, a first lens element having negative optical power; a second lens element having positive optical power; a third lens element having positive optical power; and a fourth lens element having positive optical power. The fifth lens group in the subsequent lens group has negative optical power. The first lens group is fixed with respect to the image plane in zooming from a wide-end to a tele-end upon image shooting.

11 Claims, 11 Drawing Sheets

(56) References Cited

FOREIGN PATENT DOCUMENTS

| | | | |
|---|---|---|---|
| JP | 2002-287030 | A | 10/2002 |
| JP | 2013-178410 | A | 9/2013 |
| JP | 2013-218290 | A | 10/2013 |

* cited by examiner

ZOOM LENS SYSTEM AND CAMERA SYSTEM

RELATED APPLICATIONS

This application claims the benefit of priority of Japanese Application No. 2015-051571, filed on Mar. 16, 2015, and Japanese Application No. 2015-248155, filed on Dec. 21, 2015, the disclosures of which are incorporated by reference herein.

BACKGROUND

1. Technical Field

The present disclosure relates to a zoom lens system and a camera system.

2. Description of Related Art

Unexamined Japanese Patent Publication No. 2013-218290 (hereinafter referred to as "PTL 1") discloses a zoom lens system having a six-lens configuration with positive, negative, positive, positive, negative, and positive optical powers.

In the above zoom lens system, the first lens group comprising two lens elements is fixed with respect to an image plane in zooming, and focusing is performed with the fifth lens group. In this case, the ratio of moving amounts of the fourth lens group and the fifth lens groups is specified to perform zooming.

SUMMARY

The present disclosure provides a zoom lens system comprising a plurality of lens groups that includes, in order from an object side to an image plane side, a first lens group having positive optical power; a second lens group having negative optical power; a third lens group having positive optical power; and a subsequent lens group including three lens groups which are a fourth lens group, a fifth lens group, and a sixth lens group. The first lens group includes, in order from an object side to an image plane side, a first lens element having negative optical power; a second lens element having positive optical power; a third lens element having positive optical power; and a fourth lens element having positive optical power. The fifth lens group in the subsequent lens group has negative optical power, and the first lens group is fixed with respect to the image plane in zooming from a wide-end to a tele-end upon imaging.

DETAILED DESCRIPTION

Exemplary Embodiment

Figure 1:
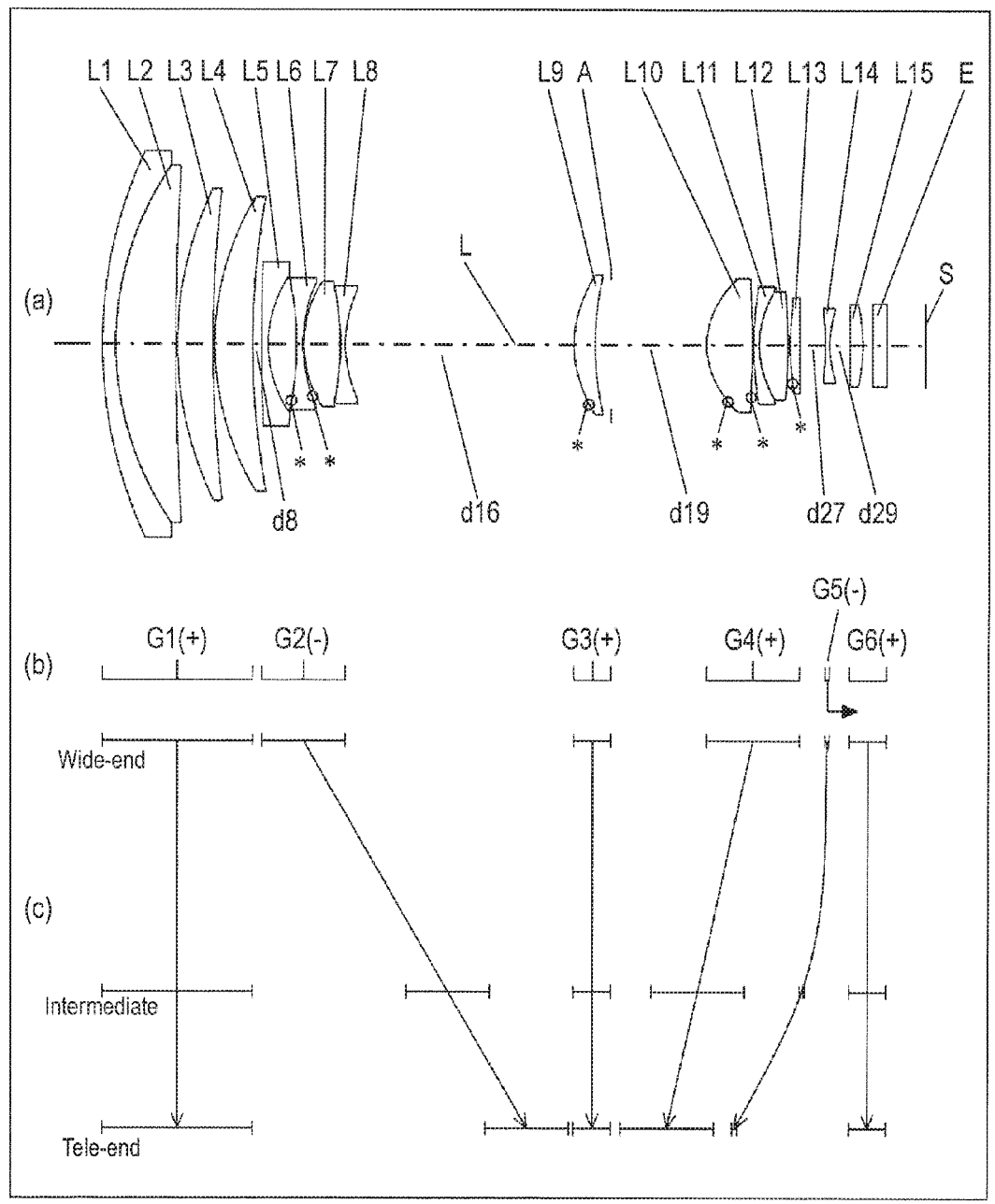
FIG. 1 is a lens arrangement diagram of a zoom lens system according to a first exemplary embodiment in an infinity in-focus condition.
Figure 2:
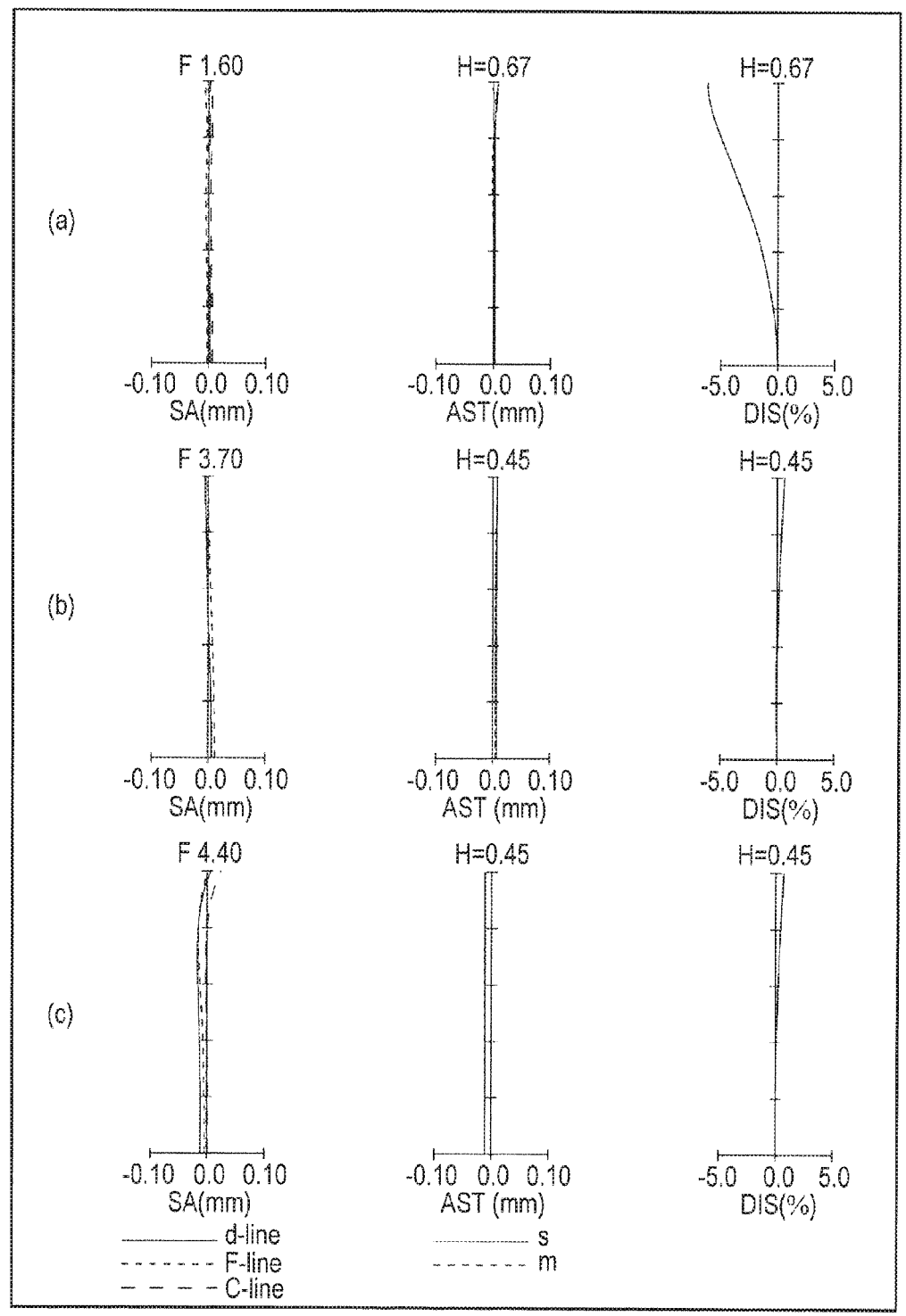
FIG. 2 is an axial aberration diagram of the zoom lens system in an infinity in-focus condition based on Numerical Example 1 according to the first exemplary embodiment.

Hereinafter, exemplary embodiments will be described in detail with reference to the accompanying drawings. It is noted, however, that descriptions in more detail than necessary will sometimes be omitted. For example, detailed descriptions of well-known items and duplicate descriptions of substantially the same configuration will sometimes be omitted. This is to avoid unnecessary redundancy in the following description and to facilitate understanding by those skilled in the art.

Note that the accompanying drawings and the following descriptions are provided so as to facilitate fully understanding of the present disclosure by those skilled in the art, and these are not intended to limit the subject matter defined by the claims.

First to Fifth Exemplary Embodiments

A zoom lens system according to each of the first to fifth exemplary embodiments will be individually described below with reference to the drawings.

The zoom lens system according to each exemplary embodiment has a six-unit lens configuration including first lens group G1, second lens group G2, third lens group G3, fourth lens group G4, fifth lens group G5, and sixth lens group G6.

FIGS. 1, 3, 5, 7, and 9 are lens arrangement diagrams of zoom lens systems in an infinity in-focus condition.

In each figure, (a) illustrates a lens arrangement at a wide-end (in the minimum focal length condition: focal length $f_W$) in a zooming condition.

In each figure, (c) illustrates a position of each lens group respectively at a wide-end, an intermediate position (in an intermediate focal length condition: focal length $f_M = \sqrt{(f_W * f_T)}$), and a tele-end (in the maximum focal length condition: focal length $f_T$) in order from the top, the positions in the respective conditions being connected with an arrow. In the part between the wide-end and the intermediate position, and the part between the intermediate position and the tele-end, the positions are connected simply with a straight line, and therefore this line does not indicate actual motion of each lens group.

The direction of the arrow attached to each lens group in each figure indicates the arrangement state in focusing from an infinity in-focus condition to a close-object in-focus condition. Specifically, the arrow on fifth lens group G5(−) in (b) in each figure indicates a direction along which a focusing lens group moves in focusing from an infinity in-focus condition to a close-object in-focus condition, for example.

Each figure illustrates reference marks of the respective lens groups. Therefore, for the sake of convenience, an arrow indicating focusing is placed beneath a reference numeral of each lens group (for example, an arrow illustrated at fifth lens group G5(−) in (b) in each figure). However, the direction along which each lens group moves in focusing in each zooming condition will be specifically described later for each exemplary embodiment.

In (a) in each figure, an asterisk "*" attached to a surface of a specific lens element indicates that the surface is aspheric.

Further, in (b) in each figure, a symbol (+) or (−) attached to the reference symbol of each lens group (G1 to G6) corresponds to the sign of the optical power of each lens group. Still further, in (a) in each figure, a straight line located on the most right-hand side indicates the position of image plane S. Therefore, the left-hand side in each figure corresponds to an object side. Parallel plate E such as a low-pass filter or a cover glass is disposed between sixth lens group G6 and image plane S.

First Exemplary Embodiment

A zoom lens system according to the first exemplary embodiment will be described below with reference to FIG. 1.

As illustrated in FIG. 1(a), the zoom lens system according to the present exemplary embodiment includes a six-unit lens configuration as described above. The zoom lens systems according to the following exemplary embodiments also have a six-unit lens configuration.

The first lens group G1 includes first lens element L1, second lens element L2, third lens element L3, and fourth lens element L4, in order from the object side to an image plane S side. First lens element L1 has a negative meniscus shape with a convex surface facing the object side. Second lens element L2 has a positive meniscus shape with a convex surface facing the object side. Third lens element L3 has a positive meniscus shape with a convex surface facing the object side. Fourth lens element L4 has a positive meniscus shape with a convex surface facing the object side. With this configuration, first lens group G1 has positive optical power. First lens element L1 and second lens element L2 are bonded to each other with an adhesive layer (not illustrated) interposed therebetween. Therefore, in the surface data of later-described Numerical Example 1 corresponding to the first exemplary embodiment, a surface number 2 is assigned to the adhesive layer between first lens element L1 and second lens element L2.

Second lens group G2 includes, in order from the object side to the image plane S side, negative meniscus fifth lens element L5 with a convex surface facing the object side, bi-concave sixth lens element L6, bi-convex seventh lens element L7, and bi-concave eighth lens element L8. Both surfaces of sixth lens element L6 are aspheric. With this configuration, second lens group G2 has negative optical power. Seventh lens element L7 and eighth lens element L8 are bonded to each other with an adhesive layer (not illustrated) interposed therebetween. Therefore, in the surface data of later-described Numerical Example 1, a surface number 14 is assigned to the adhesive layer between seventh lens element L7 and eighth lens element L8.

Third lens group G3 includes positive meniscus ninth lens element L9 with a convex surface facing the object side, and aperture diaphragm A, in order from the object side. The surface of ninth lens element L9 at the object side is aspheric. With this configuration, third lens group G3 has positive optical power.

Fourth lens group G4 includes, in order from the object side to the image plane S side, bi-convex tenth lens element L10, eleventh lens element L11, bi-convex twelfth lens element L12, and thirteenth lens element L13. Eleventh lens element L11 has a negative meniscus shape with a convex surface facing the object side. Thirteenth lens element L13 has a positive meniscus shape with a convex surface facing the object side. Both surfaces of tenth lens element L10 and the surface of thirteenth lens element L13 at the object side are aspheric. With this configuration, fourth lens group G4 has positive optical power. Eleventh lens element L11 and twelfth lens element L12 are bonded to each other with an adhesive layer (not illustrated) interposed therebetween. Therefore, in the surface data of Numerical Example 1, a surface number 23 is assigned to the adhesive layer between eleventh lens element L11 and twelfth lens element L12.

Fifth lens group G5 includes only bi-concave fourteenth lens element L14. With this configuration, fifth lens group G5 has negative optical power.

Sixth lens group G6 includes only bi-convex fifteenth lens element L15. With this configuration, sixth lens group G6 has positive optical power.

As described above, the zoom lens system according to the present exemplary embodiment includes six lens groups.

As illustrated in FIG. 1(c), each lens group in the zoom lens system according to the present exemplary embodiment moves as described below at the tele-end relative to the wide-end in zooming upon imaging.

First lens group G1, third lens group G3, and sixth lens group G6 are fixed with respect to image plane S.

Firstly, second lens group G2 moves toward image plane S side, so that space d8 between first lens group G1 and second lens group G2 is increased. With this, space d16 between second lens group G2 and third lens group G3 is decreased. Fourth lens group G4 moves toward the object side, so that space d19 between third lens group G3 and fourth lens group G4 is decreased.

Fourth lens group G4 and fifth lens group G5 move toward the object side. In this case, fourth lens group G4 and fifth lens group G5 move such that space d27 between fourth lens group G4 and fifth lens group G5 is decreased finally at the tele-end. That is, space d27 may be increased during the movement from the wide-end to the tele-end.

Further, space d29 between fifth lens group G5 and sixth lens group G6 is increased, since fifth lens group G5 moves toward the object side.

As described above, in the zoom lens system according to the present exemplary embodiment, second lens group G2, fourth lens group G4, and fifth lens group G5 relatively move along optical axis L. With this, a zooming operation from the wide-end to the tele-end is performed. The operation from the tele-end to the wide-end is performed with the reverse motion of each lens group.

Notably, fifth lens group G5, which is a focusing lens group, moves toward image plane S side along optical axis L in any of wide to tele zooming conditions in focusing from an infinity in-focus condition to a close-object in-focus condition. Specifically, as illustrated in (c) in each figure, fifth lens group G5 moves toward the object side in zooming condition from a wide-end to a tele-end. In focusing, fifth lens group G5 moves toward image plane S side at the position of the zooming condition to perform focusing as indicated by the arrow in (b) in each figure.

Second Exemplary Embodiment

Figure 3:
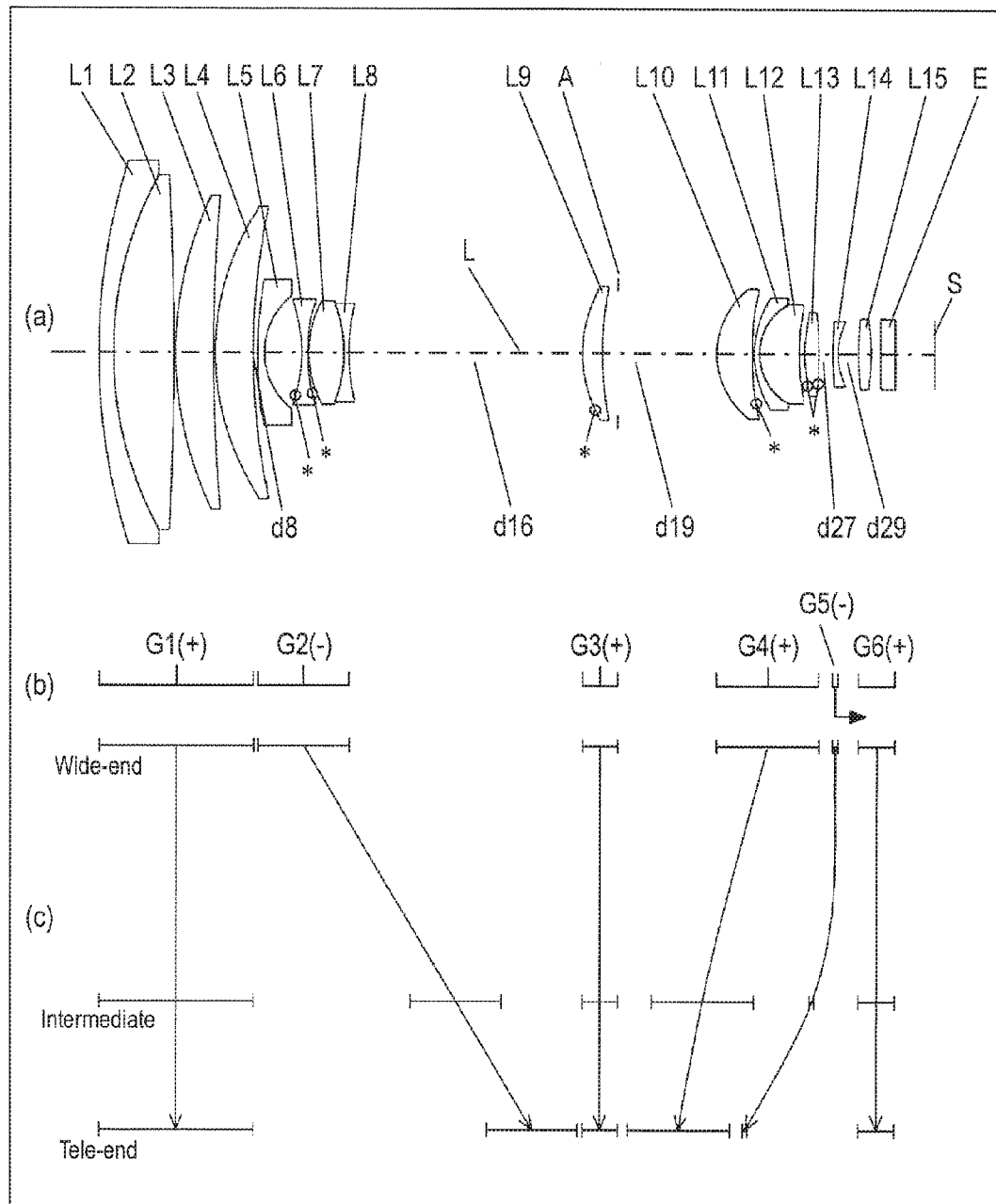
FIG. 3 is a lens arrangement diagram of a zoom lens system according to a second exemplary embodiment in an infinity in-focus condition.
Figure 4:
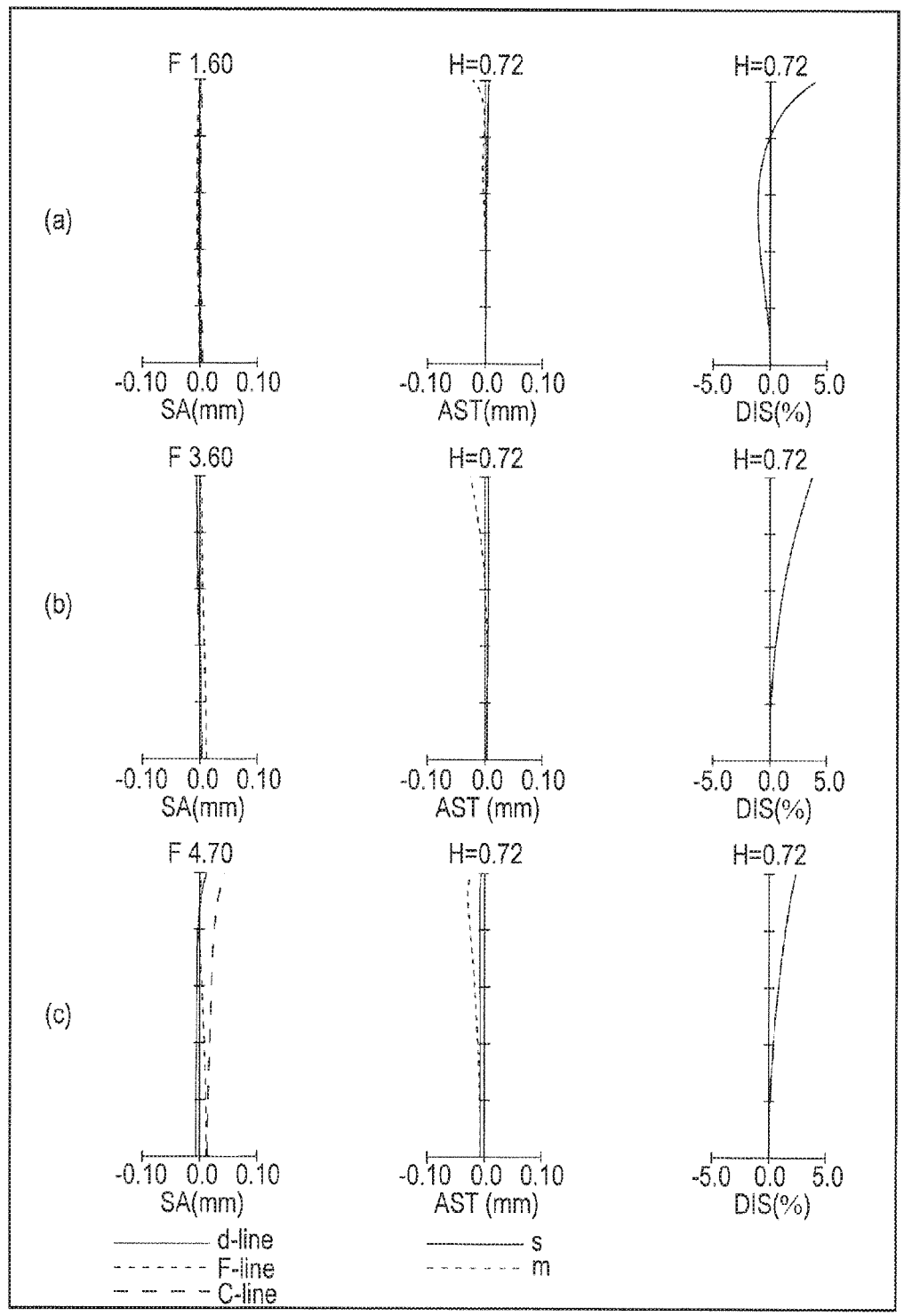
FIG. 4 is an axial aberration diagram of the zoom lens system in an infinity in-focus condition based on Numerical Example 2 according to the second exemplary embodiment.

A zoom lens system according to the second exemplary embodiment will be described below with reference to FIG. 3.

As illustrated in FIG. 3(a), first lens group G1 in the zoom lens system according to the present exemplary embodiment includes, in order from an object side to an image plane S side, first lens element L1, bi-convex second lens element L2, third lens element L3, and fourth lens element L4. First lens element L1 has a negative meniscus shape with a convex surface facing the object side. Third lens element L3 has a positive meniscus shape with a convex surface facing the object side. Fourth lens element L4 has a positive meniscus shape with a convex surface facing the object side. With this configuration, first lens group G1 has positive optical power. First lens element L1 and second lens element L2 are bonded to each other with an adhesive layer (not illustrated) interposed therebetween. Therefore, in the surface data of later-described Numerical Example 2 corresponding to the second exemplary embodiment, a surface number 2 is assigned to the adhesive layer between first lens element L1 and second lens element L2.

Second lens group G2 includes, in order from the object side to the image plane S side, negative meniscus fifth lens element L5 with a convex surface facing the object, bi-concave sixth lens element L6, bi-convex seventh lens element L7, and bi-concave eighth lens element L8. Both surfaces of sixth lens element L6 are aspheric. With this configuration, second lens group G2 has negative optical power. Seventh lens element L7 and eighth lens element L8 are bonded to each other with an adhesive layer (not illustrated) interposed therebetween. Therefore, in the surface data of Numerical Example 2, a surface number 14 is assigned to the adhesive layer (not illustrated) between seventh lens element L7 and eighth lens element L8.

Third lens group G3 includes positive meniscus ninth lens element L9 with a convex surface facing the object side, and aperture diaphragm A, in order from the object side. The surface of ninth lens element L9 at the object side is aspheric. With this configuration, third lens group G3 has positive optical power.

Fourth lens group G4 includes, in order from the object side to the image plane S side, tenth lens element L10, eleventh lens element L11, twelfth lens element L12, and bi-convex thirteenth lens element L13. Tenth lens element L10 has a positive meniscus shape with a convex surface facing the object side. Eleventh lens element L11 has a negative meniscus shape with a convex surface facing the object side. Twelfth lens element L12 has a positive meniscus shape with a convex surface facing the object side. With this configuration, fourth lens group G4 has positive optical power. Eleventh lens element L11 and twelfth lens element L12 are bonded to each other with an adhesive layer (not illustrated) interposed therebetween. Therefore, in the surface data of Numerical Example 2, a surface number 23 is assigned to the adhesive layer between eleventh lens element L11 and twelfth lens element L12. The surface of tenth lens element L10 at the image plane S side and both surfaces of thirteenth lens element L13 are aspheric.

Fifth lens group G5 includes only negative meniscus fourteenth lens element L14 with a convex surface facing the object side. With this configuration, fifth lens group G5 has negative optical power.

Sixth lens group G6 includes only bi-convex fifteenth lens element L15. With this configuration, sixth lens group G6 has positive optical power.

As described above, the zoom lens system according to the present exemplary embodiment includes six lens groups.

As illustrated in FIG. 3(c), each lens group in the zoom lens system according to the present exemplary embodiment moves as described below at the tele-end relative to the wide-end in zooming upon imaging.

In this case, first lens group G1, third lens group G3, and sixth lens group G6 are fixed with respect to image plane S, as in the first exemplary embodiment.

Firstly, second lens group G2 moves toward image plane S side, so that space d8 between first lens group G1 and second lens group G2 is increased. With this, space d16 between second lens group G2 and third lens group G3 is decreased. Fourth lens group G4 moves toward the object side, so that space d19 between third lens group G3 and fourth lens group G4 is decreased.

Fourth lens group G4 and fifth lens group G5 move toward the object side. In this case, fourth lens group G4 and fifth lens group G5 move such that space d27 between fourth lens group G4 and fifth lens group G5 is decreased finally at the tele-end. That is, space d27 may be increased during the movement from the wide-end to the tele-end.

Further, space d29 between fifth lens group G5 and sixth lens group G6 is increased, since fifth lens group G5 moves toward the object side.

As described above, in the zoom lens system according to the present exemplary embodiment, second lens group G2, fourth lens group G4, and fifth lens group G5 relatively move along optical axis L. With this, a zooming operation from the wide-end to the tele-end is performed.

Notably, fifth lens group G5, which is a focusing lens group, moves toward image plane S side along optical axis L in any of wide to tele zooming conditions in focusing from an infinity in-focus condition to a close-object in-focus condition.

Third Exemplary Embodiment

Figure 5:
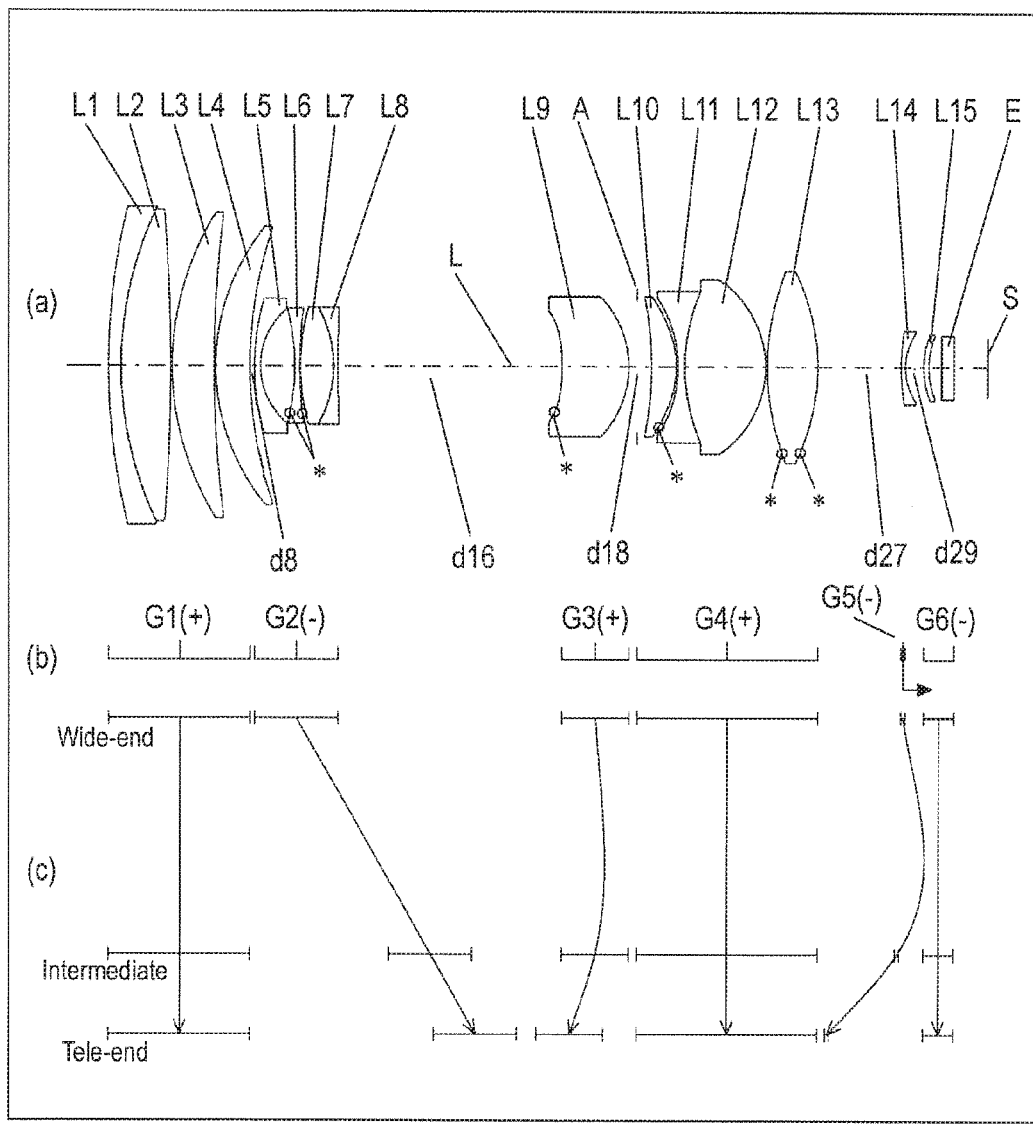
FIG. 5 is a lens arrangement diagram of a zoom lens system according to a third exemplary embodiment in an infinity in-focus condition.
Figure 6:
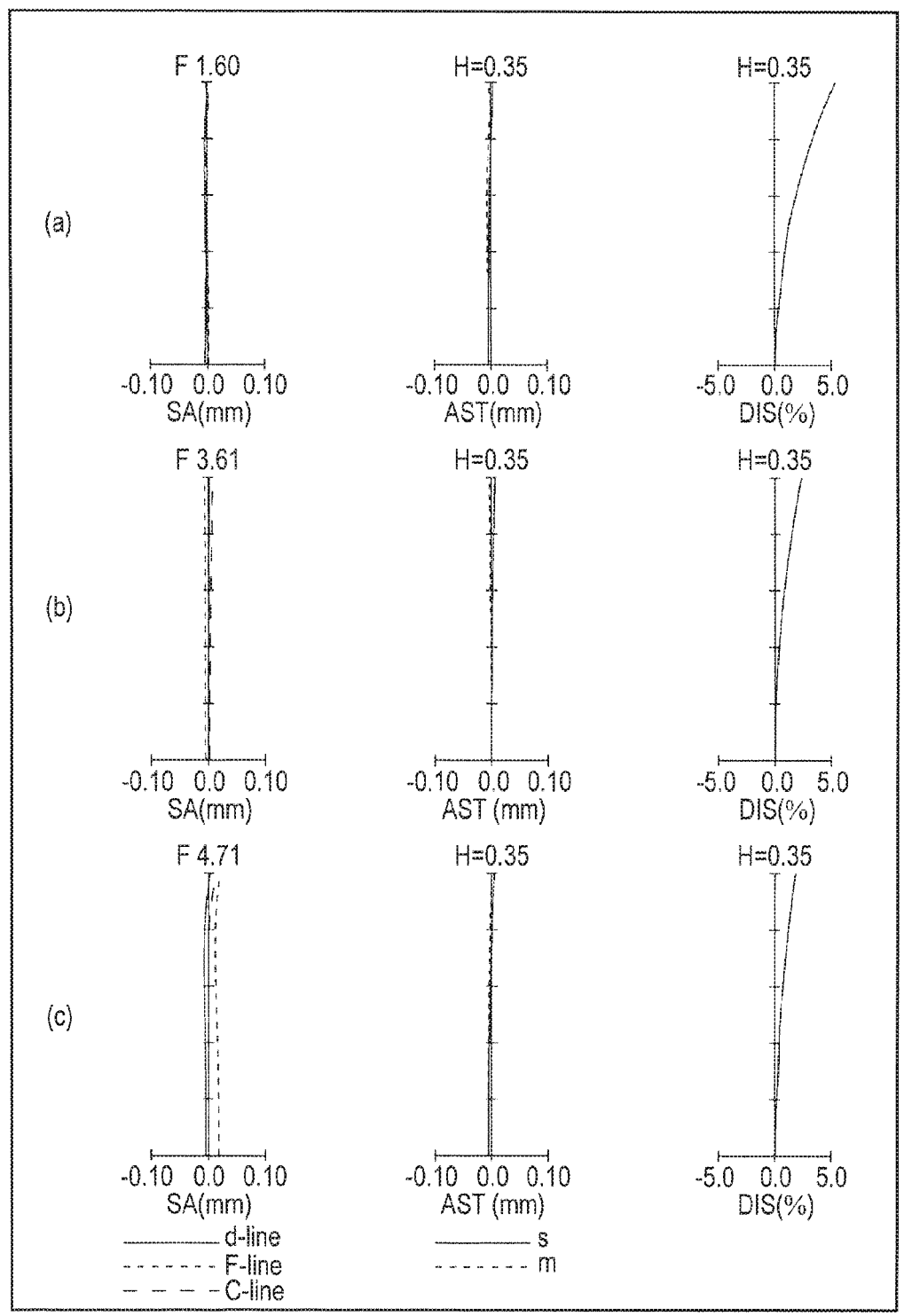
FIG. 6 is an axial aberration diagram of the zoom lens system in an infinity in-focus condition based on Numerical Example 3 according to the third exemplary embodiment.

A zoom lens system according to the third exemplary embodiment will be described below with reference to FIG. 5.

As illustrated in FIG. 5(a), first lens group G1 in the zoom lens system according to the present exemplary embodiment includes, in order from an object side to an image plane S side, first lens element L1, bi-convex second lens element L2, third lens element L3, and fourth lens element L4. First lens element L1 has a negative meniscus shape with a convex surface facing the object side. Third lens element L3 has a positive meniscus shape with a convex surface facing the object side. Fourth lens element L4 has a positive meniscus shape with a convex surface facing the object side. With this configuration, first lens group G1 has positive optical power. First lens element L1 and second lens element L2 are bonded to each other with an adhesive layer (not illustrated) interposed therebetween. Therefore, in the surface data of later-described Numerical Example 3 corresponding to the third exemplary embodiment, a surface number 2 is assigned to the adhesive layer between first lens element L1 and second lens element L2.

Second lens group G2 includes, in order from the object side to the image plane S side, negative meniscus fifth lens element L5 with a convex surface facing the object side, bi-concave sixth lens element L6, bi-convex seventh lens element L7, and bi-concave eighth lens element L8. Both surfaces of sixth lens element L6 are aspheric. With this configuration, second lens group G2 has negative optical power. Seventh lens element L7 and eighth lens element L8 are bonded to each other with an adhesive layer (not illustrated) interposed therebetween. Therefore, in the surface data of Numerical Example 3, a surface number 14 is assigned to the adhesive layer between seventh lens element L7 and eighth lens element L8.

Third lens group G3 includes positive meniscus ninth lens element L9 with a convex surface facing the image plane S side, and aperture diaphragm A, in order from the object side. The surface of ninth lens element L9 at the object side is aspheric. With this configuration, third lens group G3 has positive optical power.

Fourth lens group G4 includes, in order from the object side to the image plane S side, positive meniscus tenth lens element L10 with a convex surface facing the image plane S side, bi-concave eleventh lens element L11, bi-convex twelfth lens element L12, and bi-convex thirteenth lens element L13. With this configuration, fourth lens group G4 has positive optical power. Eleventh lens element L11 and twelfth lens element L12 are bonded to each other with an adhesive layer (not illustrated) interposed therebetween. Therefore, in the surface data of Numerical Example 3, a surface number 23 is assigned to the adhesive layer between eleventh lens element L11 and twelfth lens element L12. The surface of tenth lens element L10 at the image plane S side and both surfaces of thirteenth lens element L13 are aspheric.

Fifth lens group G5 includes only negative meniscus fourteenth lens element L14 with a convex surface facing the object side. With this configuration, fifth lens group G5 has negative optical power.

Sixth lens group G6 includes only negative meniscus fifteenth lens element L15 with a convex surface facing the object side. With this configuration, sixth lens group G6 has negative optical power.

As described above, the zoom lens system according to the present exemplary embodiment includes six lens groups.

As illustrated in the lowermost chart in FIG. 5, each lens group in the zoom lens system according to the present exemplary embodiment moves as described below at the tele-end relative to the wide-end in zooming upon imaging.

In this case, first lens group G1, fourth lens group G4, and sixth lens group G6 are fixed with respect to image plane S in the present exemplary embodiment.

Firstly, second lens group G2 moves toward image plane S side, so that space d8 between first lens group G1 and second lens group G2 is increased. With this, space d16 between second lens group G2 and third lens group G3 is decreased. In this case, third lens group G3 moves toward the object side. With this, space d18 between third lens group G3 and fourth lens group G4, which is fixed with respect to image plane S, is increased.

Fifth lens group G5 temporarily moves toward image plane S up to a predetermined zooming position from the wide-end to the tele-end. Then, fifth lens group G5 moves away from image plane S. Specifically, fifth lens group G5 moves toward the object side with a projection curve relative to image plane S. With this, space d27 between fourth lens group G4 and fifth lens group G5 is decreased.

Further, space d29 between fifth lens group G5 and sixth lens group G6 is increased, since fifth lens group G5 moves toward the object side.

As described above, in the zoom lens system according to the present exemplary embodiment, second lens group G2, third lens group G3, and fifth lens group G5 relatively move along optical axis L. With this, a zooming operation from the wide-end to the tele-end is performed.

Notably, fifth lens group G5, which is a focusing lens group, moves toward image plane S side along optical axis L in any of wide and tele zooming conditions in focusing from an infinity in-focus condition to a close-object in-focus condition.

Fourth Exemplary Embodiment

Figure 7:
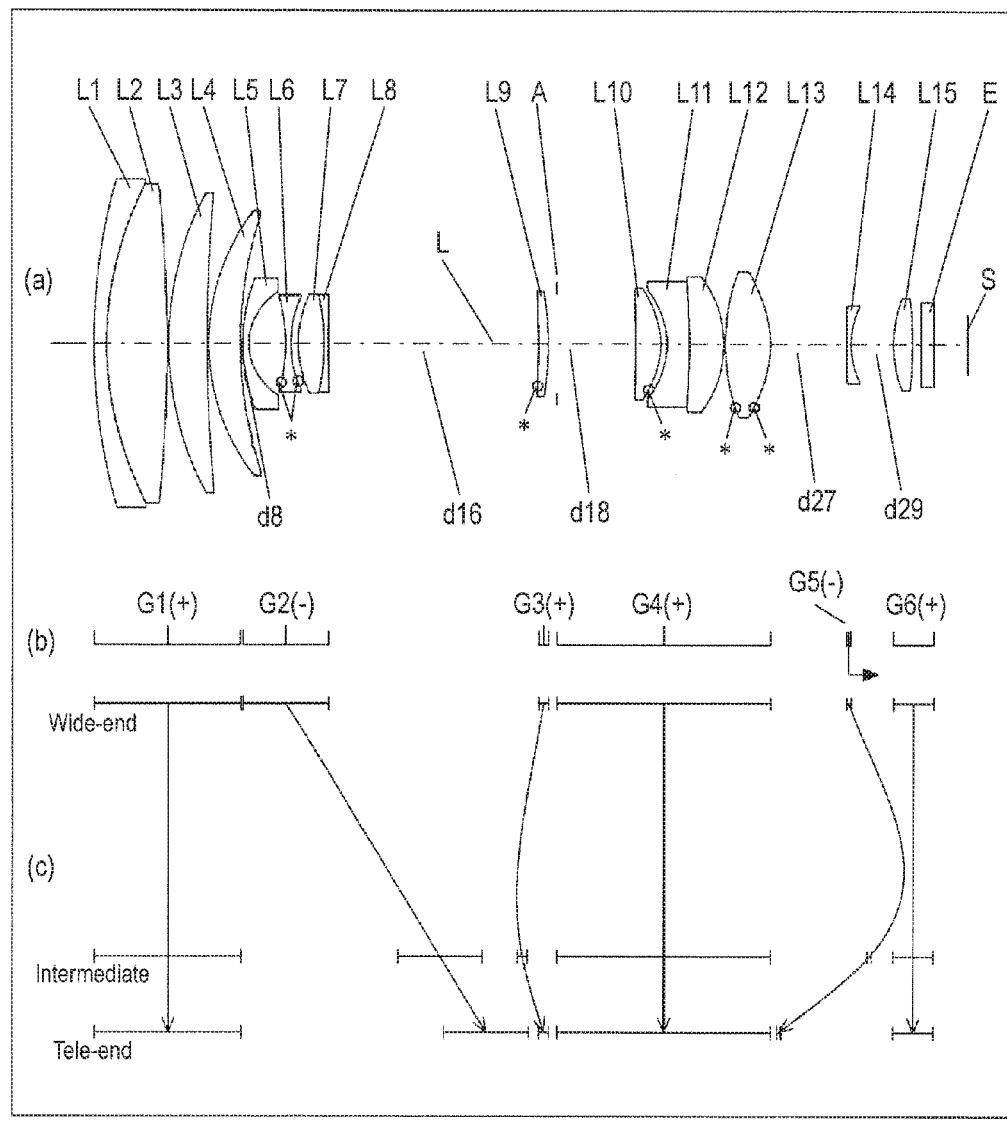
FIG. 7 is a lens arrangement diagram of a zoom lens system according to a fourth exemplary embodiment in an infinity in-focus condition.
Figure 8:
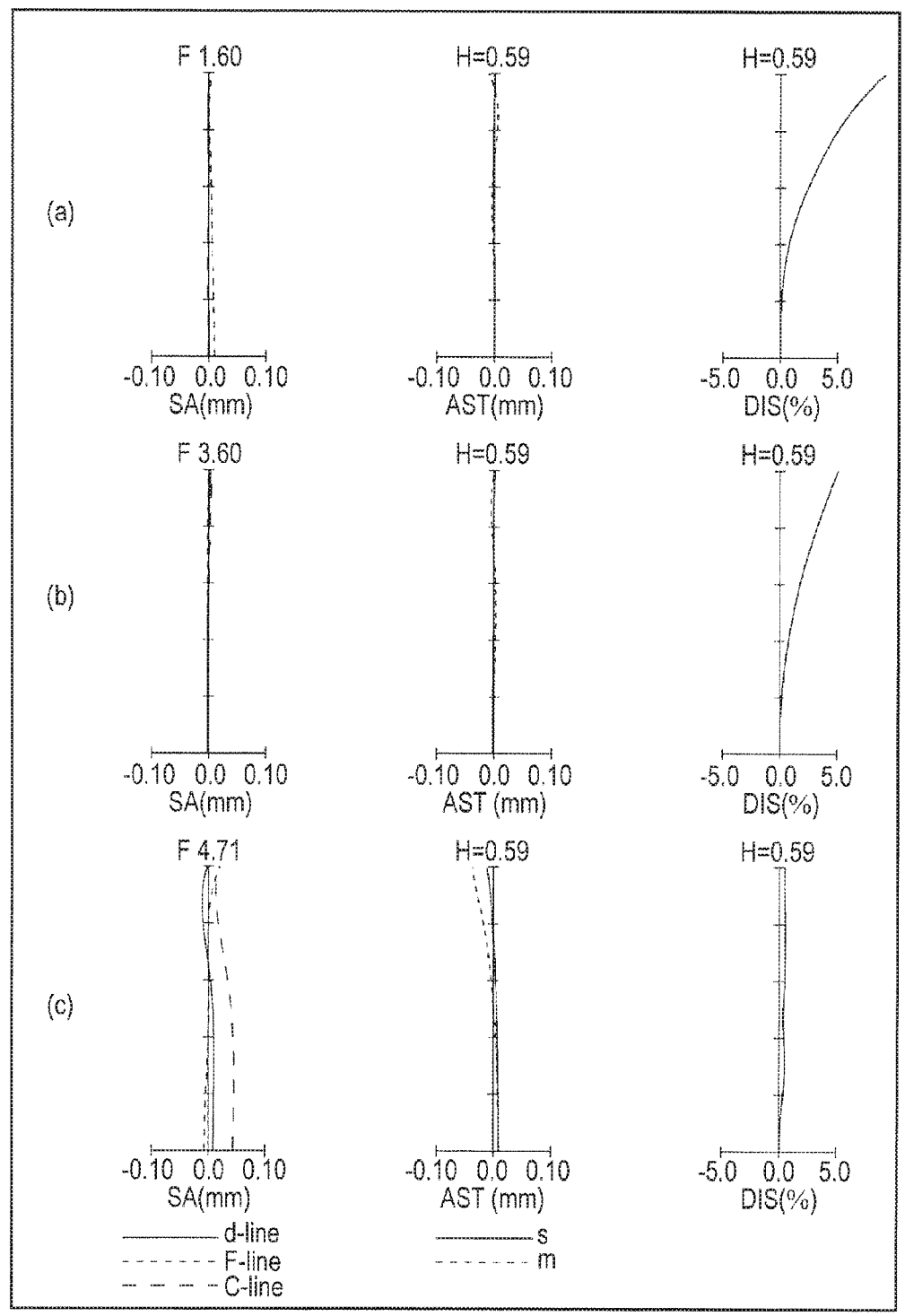
FIG. 8 is an axial aberration diagram of the zoom lens system in an infinity in-focus condition based on Numerical Example 4 according to the fourth exemplary embodiment.

A zoom lens system according to the fourth exemplary embodiment will be described below with reference to FIG. 7.

As illustrated in FIG. 7(a), first lens group G1 in the zoom lens system according to the present exemplary embodiment includes, in order from an object side to an image plane S side, first lens element L1, bi-convex second lens element L2, third lens element L3, and fourth lens element L4. First lens element L1 has a negative meniscus shape with a convex surface facing the object side. Third lens element L3 has a positive meniscus shape with a convex surface facing the object side. Fourth lens element L4 has a positive meniscus shape with a convex surface facing the object side. With this configuration, first lens group G1 has positive optical power. First lens element L1 and second lens element L2 are bonded to each other with an adhesive layer (not illustrated) interposed therebetween. Therefore, in the surface data of later-described Numerical Example 4 corresponding to the fourth exemplary embodiment, a surface number 2 is assigned to the adhesive layer between first lens element L1 and second lens element L2.

Second lens group G2 includes, in order from the object side to the image plane S side, negative meniscus fifth lens element L5 with a convex surface facing the object side, bi-concave sixth lens element L6, bi-convex seventh lens element L7, and bi-concave eighth lens element L8. Both surfaces of sixth lens element L6 are aspheric. With this configuration, second lens group G2 has negative optical power. Seventh lens element L7 and eighth lens element L8 are bonded to each other with an adhesive layer (not illustrated) interposed therebetween. Therefore, in the surface data of Numerical Example 4, a surface number 14 is assigned to the adhesive layer between seventh lens element L7 and eighth lens element L8.

Third lens group G3 includes positive meniscus ninth lens element L9 with a convex surface facing the image plane S side, and aperture diaphragm A, in order from the object side. The surface of ninth lens element L9 at the object side is aspheric. With this configuration, third lens group G3 has positive optical power.

Fourth lens group G4 includes, in order from the object side to the image plane S side, tenth lens element L10, eleventh lens element L11, twelfth lens element L12, and bi-convex thirteenth lens element L13. Tenth lens element L10 has a positive meniscus shape with a convex surface facing the image plane S side. Eleventh lens element L11 has a negative meniscus shape with a convex surface facing the image plane S side. Twelfth lens element L12 has a positive meniscus shape with a convex surface facing the image plane S side. With this configuration, fourth lens group G4 has positive optical power. Eleventh lens element L11 and twelfth lens element L12 are bonded to each other with an adhesive layer (not illustrated) interposed therebetween. Therefore, in the surface data of Numerical Example 4, a surface number 23 is assigned to the adhesive layer between eleventh lens element L11 and twelfth lens element L12. The surface of tenth lens element L10 at the image plane S side and both surfaces of thirteenth lens element L13 are aspheric.

Fifth lens group G5 includes only negative meniscus fourteenth lens element L14 with a convex surface facing the object side. With this configuration, fifth lens group G5 has negative optical power.

Sixth lens group G6 includes only bi-convex fifteenth lens element L15. With this configuration, sixth lens group G6 has positive optical power.

As described above, the zoom lens system according to the present exemplary embodiment includes six lens groups.

As illustrated in FIG. 7(c), each lens group in the zoom lens system according to the present exemplary embodiment moves as described below at the tele-end relative to the wide-end in zooming upon imaging.

In this case, first lens group G1, fourth lens group G4, and sixth lens group G6 are fixed with respect to image plane S in the present exemplary embodiment.

Firstly, second lens group G2 moves toward image plane S side, so that space d8 between first lens group G1 and second lens group G2 is increased. With this, space d16 between second lens group G2 and third lens group G3 is decreased.

In this case, space d18 between third lens group G3 and fourth lens group G4, which is fixed with respect to image plane S, is not changed at the wide-end and the tele-end. However, third lens group G3 temporarily moves away from (apart from) image plane S up to a predetermined zooming position from the wide-end to the tele-end. Then, third lens group G3 moves closer to image plane S to return to the same position. Specifically, third lens group G3 moves toward the object side with a projection curve relative to image plane S.

On the other hand, fifth lens group G5 temporarily moves closer to image plane S up to a predetermined zooming position from the wide-end to the tele-end. Then, fifth lens group G5 moves away from image plane S. Specifically, fifth lens group G5 moves toward the object side with a projection curve relative to image plane S. With this, space d27 between fourth lens group G4 and fifth lens group G5 is decreased.

Further, space d29 between fifth lens group G5 and sixth lens group G6 is increased, since fifth lens group G5 moves toward the object side.

As described above, in the zoom lens system according to the present exemplary embodiment, second lens group G2, third lens group G3, and fifth lens group G5 relatively move along optical axis L. With this, a zooming operation from the wide-end to the tele-end is performed.

Notably, fifth lens group G5, which is a focusing lens group, moves toward image plane S side along optical axis L in any of wide and tele zooming conditions in focusing from an infinity in-focus condition to a close-object in-focus condition.

Fifth Exemplary Embodiment

Figure 9:
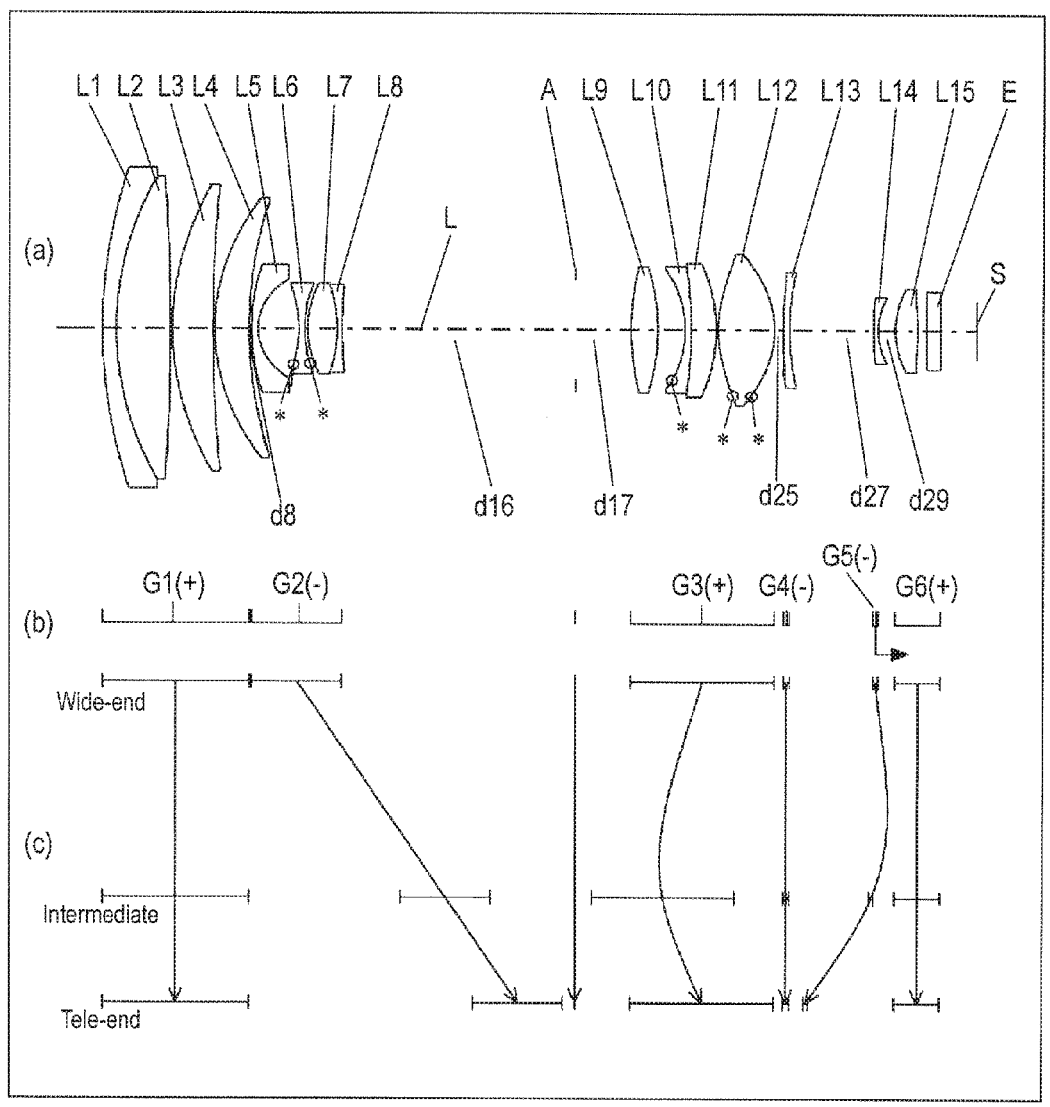
FIG. 9 is a lens arrangement diagram of a zoom lens system according to a fifth exemplary embodiment in an infinity in-focus condition.
Figure 10:
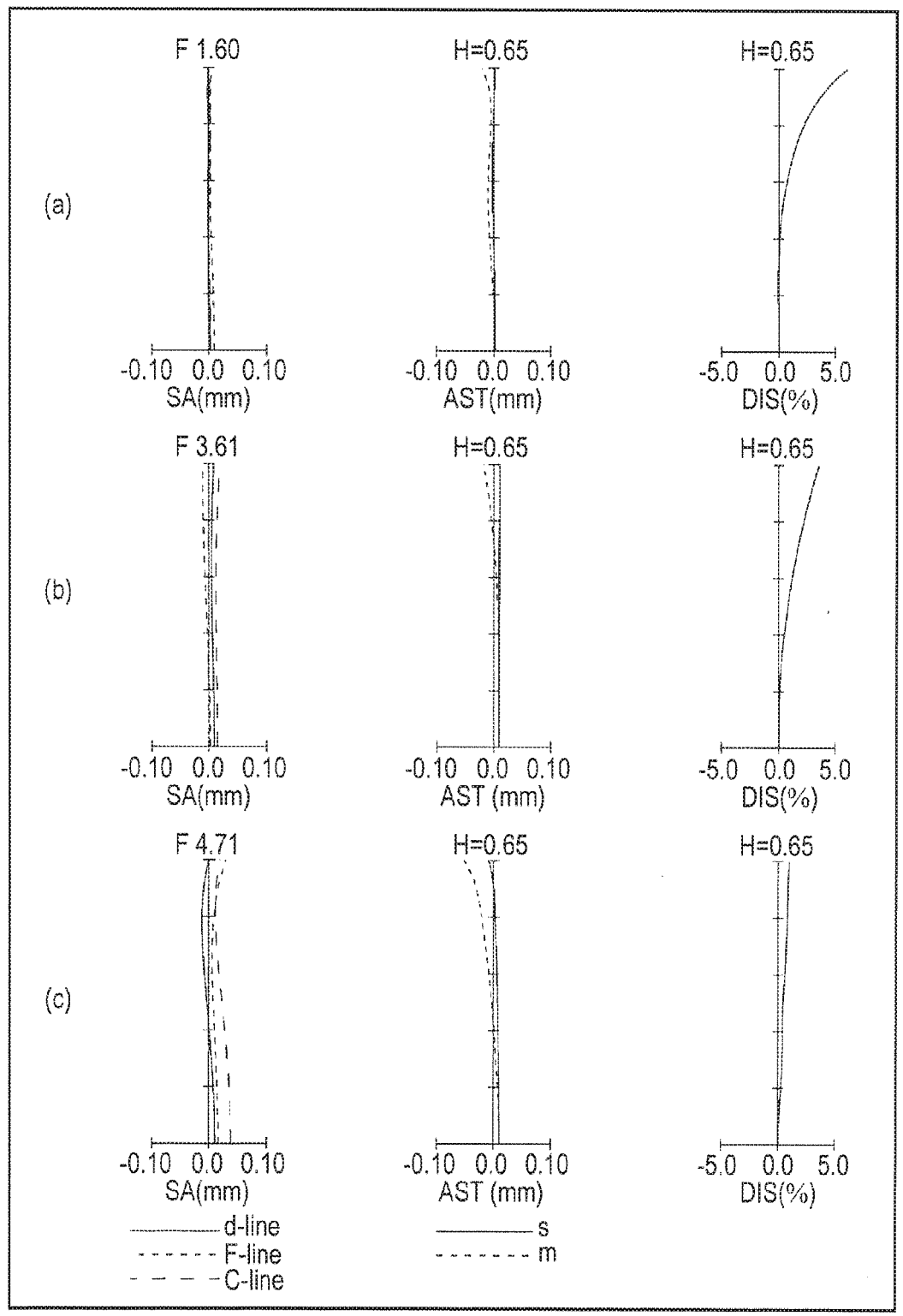
FIG. 10 is an axial aberration diagram of the zoom lens system in an infinity in-focus condition based on Numerical Example 5 according to the fifth exemplary embodiment.

A zoom lens system according to the fifth exemplary embodiment will be described below with reference to FIG. 9.

As illustrated in FIG. 9(a), first lens group G1 in the zoom lens system according to the present exemplary embodiment includes, in order from an object side to an image plane S side, first lens element L1, bi-convex second lens element L2, third lens element L3, and fourth lens element L4. First lens element L1 has a negative meniscus shape with a convex surface facing the object side. Third lens element L3 has a positive meniscus shape with a convex surface facing the object side. Fourth lens element L4 has a positive meniscus shape with a convex surface facing the object side. With this configuration, first lens group G1 has positive optical power. First lens element L1 and second lens element L2 are bonded to each other with an adhesive layer interposed therebetween. Therefore, in the surface data of corresponding Numerical Example 5 described below, a surface number 2 is assigned to the adhesive layer between first lens element L1 and second lens element L2.

Second lens group G2 includes, in order from the object side to the image plane S side, negative meniscus fifth lens element L5 with a convex surface facing the object side, bi-concave sixth lens element L6, bi-convex seventh lens element L7, and bi-concave eighth lens element L8. Both surfaces of sixth lens element L6 are aspheric. With this configuration, second lens group G2 has negative optical power. Seventh lens element L7 and eighth lens element L8 are bonded to each other with an adhesive layer (not illustrated) interposed therebetween. Therefore, in the surface data of later-described Numerical Example 5 corresponding to the fifth exemplary embodiment, a surface number 14 is assigned to the adhesive layer between seventh lens element L7 and eighth lens element L8. Aperture diaphragm A is disposed to second lens group G2 near the image plane S side.

Third lens group G3 includes, in order from the object side to the image plane S side, bi-convex ninth lens element L9, tenth lens element L10, eleventh lens element L11, and bi-convex twelfth lens element L12. Tenth lens element L10 has a negative meniscus shape with a convex surface facing an image plane side. Eleventh lens element L11 has a positive meniscus shape with a convex surface facing an image plane side. The surface of tenth lens element L10 at the object side is aspheric. With this configuration, third lens group G3 has positive optical power. Tenth lens element L10 and eleventh lens element L11 are bonded to each other with an adhesive layer (not illustrated) interposed therebetween. Therefore, in the surface data of Numerical Example 5, a surface number 21 is assigned to the adhesive layer between eleventh lens element L11 and twelfth lens element L12. The surface of tenth lens element L10 at the object side and both surfaces of twelfth lens element L12 are aspheric.

Fourth lens group G4 includes only negative meniscus thirteenth lens element L13 with a convex surface facing the object side. With this configuration, fourth lens group G4 has negative optical power.

Fifth lens group G5 includes only negative meniscus fourteenth lens element L14 with a convex surface facing the object side. With this configuration, fifth lens group G5 has negative optical power.

Sixth lens group G6 includes only bi-convex fifteenth lens element L15. With this configuration, sixth lens group G6 has positive optical power.

As described above, the zoom lens system according to the present exemplary embodiment includes six lens groups.

As illustrated in FIG. 9(c), each lens group in the zoom lens system according to the present exemplary embodiment moves as described below from the wide-end to the tele-end in zooming upon imaging.

In this case, first lens group G1, fourth lens group G4, and sixth lens group G6 are fixed with respect to image plane S in the present exemplary embodiment.

Firstly, second lens group G2 moves toward image plane S side, so that space d8 between first lens group G1 and second lens group G2 is increased. With this, space d16 between second lens group G2 and third lens group G3 is decreased.

In this case, space d25 between third lens group G3 and fourth lens group G4, which is fixed with respect to image plane S, is not changed at the wide-end and the tele-end. However, third lens group G3 temporarily moves away from (apart from) image plane S up to a predetermined zooming position from the wide-end to the tele-end. Then, third lens group G3 moves closer to image plane S to return to the same position. Specifically, third lens group G3 moves between the wide-end and the tele-end toward the object with a projection curve relative to image plane S.

On the other hand, fifth lens group G5 temporarily moves closer to image plane S up to a predetermined zooming position from the wide-end to the tele-end. Then, fifth lens group G5 moves away from image plane S. Specifically, fifth lens group G5 moves between the wide-end and the tele-end with a projection curve relative to image plane S. With this, space d27 between fourth lens group G4 and fifth lens group G5 is temporarily increased, and then, decreased.

Space d29 between fifth lens group G5 and sixth lens group G6 is temporarily decreased due to the movement of fifth lens group G5 toward image plane S side. However, space d29 is then increased, since fifth lens group G5 moves to the object side toward the tele-end.

As described above, in the zoom lens system according to the present exemplary embodiment, second lens group G2, third lens group G3, and fifth lens group G5 relatively move along optical axis L.

Notably, fifth lens group G5 serving as a focusing lens group moves toward the image plane S side along optical axis L in any of wide and tele zooming conditions in focusing from an infinity in-focus condition to a close-object in-focus condition.

As described above, the zoom lens system according to each of the above exemplary embodiments includes, in order from the object side to the image plane S side, a first lens group G1 having positive optical power; a second lens group G2 having negative optical power; a third lens group G3 having positive optical power; and a subsequent lens group including three lens groups which are a fourth lens group G4, a fifth lens group G5, and a sixth lens group G6.

In the zoom lens system according to each of the above exemplary embodiments, first lens group G1 includes four or more lens elements including first lens element L1 having negative optical power; second lens element L2 having positive optical power; third lens element L3 having positive optical power; and fourth lens element L4 having positive optical power. With this, color aberration correction at a tele-end is especially enabled. Specifically, color aberration which is likely to occur at a tele-end in a tele lens can be corrected with first lens group G1 on which a lot of light rays are externally incident.

In the zoom lens system according to each of the above exemplary embodiments, fifth lens group G5 in the subsequent lens group has negative optical power. With this, a space required for a zooming operation or a focusing operation can be ensured. Consequently, a compact and high-power zoom lens system can be implemented.

In the zoom lens system according to each of the above exemplary embodiments, aperture diaphragm A is fixed with respect to image plane S. With this configuration, a mechanism for driving aperture diaphragm A can be eliminated. Thus, simplification of a diaphragm mechanism and downsizing of a lens barrel can be implemented.

In the zoom lens system according to the first and second exemplary embodiments, fourth lens group G4 and fifth lens group G5 move toward the object side from the image plane S side in zooming from the wide-end to the tele-end. In addition, fourth lens group G4 and fifth lens group G5 move such that the space between fourth lens group G4 and fifth lens group G5 is decreased. With this, a moving amount of fifth lens group G5 in zooming is increased, whereby high power can be implemented. In addition, a moving amount of fifth lens group G5 in focusing at the tele-end can be increased. Thus, the zoom lens system can be made compact.

In the zoom lens system according to the third to fifth exemplary embodiments, fourth lens group G4 is fixed with respect to image plane S in zooming from the wide-end to the tele-end. Also, fifth lens group G5 temporarily moves closer to image plane S side, and then, moves away from image plane S side with a projection curve, for example. This can increase a moving amount of fifth lens group G5 in focusing at the tele-end, while implementing high power.

In the zoom lens system according to each of the above exemplary embodiments, sixth lens group G6 located closest to image plane S side is fixed with respect to image plane S in zooming from the wide-end to the tele-end. This eliminates the need to form a space for moving sixth lens group G6. Thus, the overall length of the lens system can be decreased.

In the zoom lens system according to each of the above exemplary embodiments, one or more lens groups moving along an optical axis in zooming from a wide-end to a tele-end upon image shooting are disposed each side of object side and image plain side of the aperture diaphragm. This can enhance focusing performance (e.g., aberration correction), while implementing downsizing of the zoom lens systems.

In the zoom lens system according to each of the above exemplary embodiments, fifth lens group G5, which moves toward image plane S side along optical axis L in focusing from an infinity in-focus condition to a close-object in-focus condition, includes only a single lens element. With this, downsizing of the zoom lens systems and focus lens group is enabled. This results in implementing high-speed response in focusing.

Conditions which are used to implement the configurations of the zoom lens systems according to the first to fifth exemplary embodiments will be described below.

Here, a plurality of beneficial conditions is set forth for the zoom lens system according to each of the above exemplary embodiments. A configuration that satisfies all the plurality of conditions is most effective for the zoom lens system.

However, when an individual condition is satisfied, a zoom lens system having the corresponding effect is obtained, as described below.

For example, the zoom lens system according to each of the above exemplary embodiments includes, in order from the object side to the image plane S side, first lens group G1 having positive optical power; second lens group G2 having negative optical power; third lens group G3 having positive optical power and subsequent lens group including three lens groups which are fourth lens group G4, fifth lens group G5, and sixth lens group G6. Fifth lens group G5 in the subsequent lens group includes a lens having negative optical power. First lens group G1 includes four or more lens elements including first lens element L1 having negative optical power; second lens element L2 having positive optical power; third lens element L3 having positive optical power; and fourth lens element L4 having positive optical power. First lens group G1 is fixed with respect to image plane S in zooming from the wide-end to the tele-end upon image shooting. In the description below, the above lens configuration is referred to as a basic configuration in the exemplary embodiments.

A zoom lens system having the above basic configuration satisfies the following conditional expression (1).

$$0.075 < M5/La < 0.300 \tag{1}$$

where M5 is a moving amount of fifth lens group G5 in zooming from the wide-end to the tele-end, La is an overall length of the lens system (the distance from the surface of first lens group G1 at the most object side to image plane S).

Specifically, conditional expression (1) specifies a ratio between moving amount M5 of fifth lens group G5 and overall length La of the lens system in zooming from the wide-end to the tele-end. The overall length La of the lens system means the distance from the surface of first lens element L1 in first lens group G1 at the most object side to image plane S.

The zoom lens systems according to the first to fifth exemplary embodiments are configured to satisfy conditional expression (1). With this, the zoom lens systems can satisfactorily keep optical performance with high power. Consequently, the overall length La of the lens system can be decreased to implement compact zoom lens system.

When the ratio exceeds the upper limit (0.300 or more) in conditional expression (1), a ray height of fifth lens group G5 at the tele-end is increased. Therefore, more spherical aberration occurs, so that it becomes difficult to keep high optical performance. In addition, the moving amount of fifth lens group G5 in zooming becomes too large. With this, the zoom lens system becomes large-sized.

On the other hand, when the ratio becomes less than the lower limit (0.075 or less) in conditional expression (1), it becomes difficult to simultaneously implement both downsizing of the zoom lens system and aberration correction. From the above, the range of conditional expression (1) is preferable.

The zoom lens system can further enhance the above effect by satisfying at least either of following conditional expressions (1-A) and (1-B).

$$0.078 < M5/La < 0.300 \tag{1-A}$$

$$0.075 < M5/La < 0.120 \tag{1-B}$$

The zoom lens systems according to the first to fifth exemplary embodiments desirably satisfy conditional expression (2), when the lens group (sixth lens group) closest to image plane S side does not move in zooming:

$$0.62 < |Z5/f5| < 50 \tag{2}$$

where Z5 is a moving amount of fifth lens group in zooming from the wide-end to the tele-end, and f5 is a focal length of fifth lens group G5.

Specifically, conditional expression (2) specifies a ratio between moving amount Z5 of fifth lens group G5 and focal length f5 of fifth lens group G5 in zooming from the wide-end to the tele-end.

The zoom lens systems according to the first to fifth exemplary embodiments are configured to satisfy conditional expression (2). With this, aberration variation in zooming can be suppressed, whereby excellent optical performance can be obtained. Thus, the zoom lens system can entirely be made compact.

When the ratio becomes less than the lower limit (0.62 or less) in conditional expression (2), optical power of fifth lens group G5 becomes too weak, so that the focal length increases. Therefore, the moving amount of fifth lens group G5 is increased in focusing from an infinity in-focus condition to a close-object in-focus condition, so that the zoom lens system becomes large-sized.

On the other hand, when the ratio exceeds the upper limit (50 or more) in conditional expression (2), optical power of fifth lens group G5 becomes too high. Therefore, aberration variation in zooming becomes large, so that optical performance is deteriorated. From the above, the range of conditional expression (2) is preferable.

The zoom lens system can further enhance the above effect by satisfying at least either of following conditional expressions (2-A) and (2-B).

$$0.66 < |Z5/f5| < 50 \tag{2-A}$$

$$0.62 < |Z5/f5| < 5 \tag{2-B}$$

The zoom lens systems according to the first to fifth exemplary embodiments are desirably configured to satisfy conditional expression (3) described below:

$$1.75 < n \leq 2.1 \tag{3}$$

where n is a refractive index of the lens element having negative optical power to a d-line in fifth lens group G5.

Specifically, conditional expression (3) specifies the refractive index of the lens element having negative optical power to the d-line in fifth lens group G5.

The zoom lens systems according to the first to fifth exemplary embodiments are configured to satisfy conditional expression (3). With this, astigmatism aberration or curvature of field can satisfactorily be corrected in the shortest shooting distance. As a result, a zoom lens system keeping excellent optical performance can be implemented.

When n becomes lower than the lower limit (1.75 or less) in conditional expression (3), various aberrations, such as astigmatism aberration or curvature of field, occurring in focusing from the infinity in-focus condition to the close-object in-focus condition cannot be corrected. Specifically, optical power becomes weak, so that the correction of aberrations becomes difficult. In addition, since the moving distance of fifth lens group G5 is increased, downsizing of the zoom lens system becomes difficult.

On the other hand, when n exceeds the upper limit (exceeds 2.1) in conditional expression (3), various aberrations such as astigmatism aberration or curvature of field increase. From the above, the range of conditional expression (3) is preferable.

The zoom lens system can further enhance the above effect by satisfying conditional expression (3-A) below.

$$1.78 < n \tag{3-A}$$

The first to fifth exemplary embodiments describe that each lens group of zoom lens systems is a refractive lens element (specifically, a lens element deflecting light on an interface between mediums having different refractive indices) deflecting an incident ray with refraction. However, it is not limited thereto. For example, each lens group may include a diffractive lens element, a hybrid diffractive-refractive lens element, or a gradient index lens element. A diffractive lens element deflects an incident ray with diffraction. A hybrid diffractive-refractive lens element deflects an incident ray with a combination of diffraction action and refraction action. A gradient index lens element deflects an incident ray with gradual variation of the refractive index in a medium. Especially in a hybrid diffractive-refractive lens element, a diffraction structure is preferably formed on an interface between mediums having different refractive indices. With this, wavelength dependency of diffraction efficiency can further be enhanced.

Sixth Exemplary Embodiment

A camera system according to a sixth exemplary embodiment including a zoom lens system will be described below with reference to FIG. 11.

Figure 11:
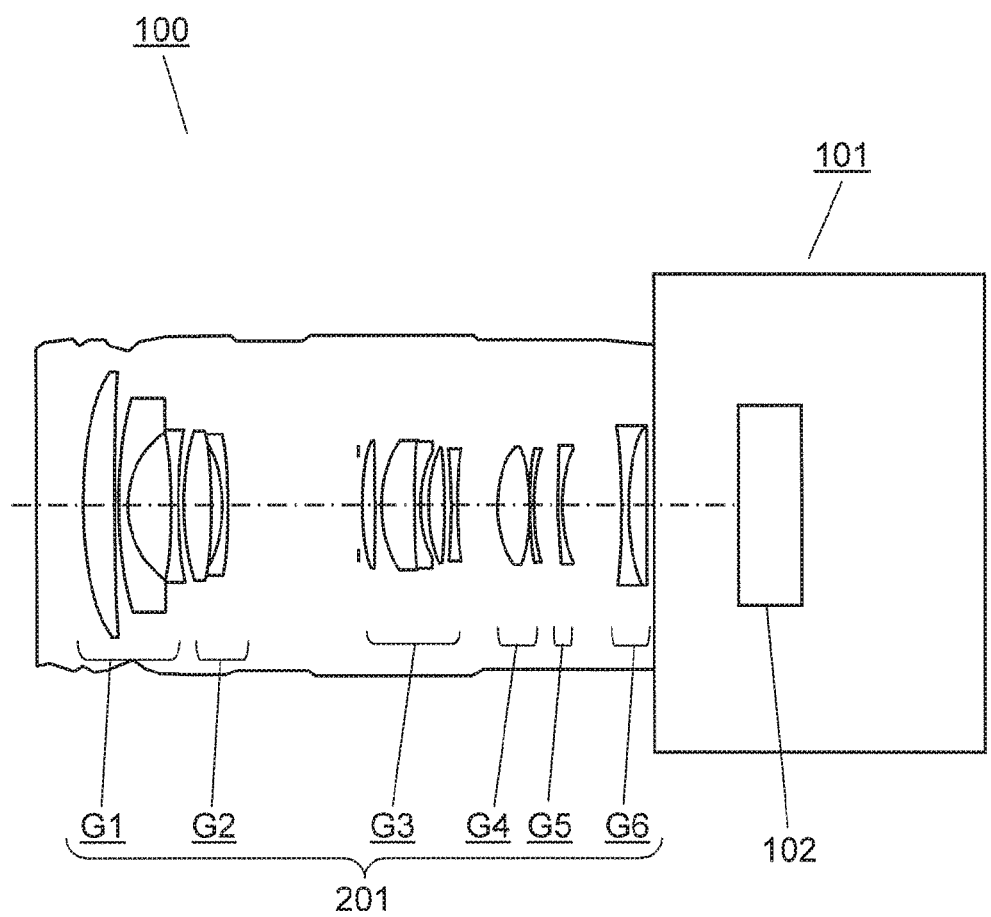
FIG. 11 is a diagram illustrating a configuration of a camera system according to a sixth exemplary embodiment including a zoom lens system.

FIG. 11 is a diagram illustrating a schematic configuration of a camera system according to the sixth exemplary embodiment including a zoom lens system. FIG. 11 illustrates the configuration in which the zoom lens system according to the first exemplary embodiment is mounted. However, the camera system may include the zoom lens systems according to the second to fifth exemplary embodiments.

As illustrated in FIG. 11, camera system 100 according to the present exemplary embodiment includes camera body 101 and zoom lens system 201 connected to camera body 101. Camera body 101 includes imaging element 102. Imaging element 102 receives an optical image formed with zoom lens system 201, and converts this image into an electric image signal.

Specifically, camera system 100 according to the present exemplary embodiment includes zoom lens system 201 according to any one of the first to fifth exemplary embodiments. Therefore, camera system 100 that is compact and has excellent focusing performance can be implemented.

The above first to fifth exemplary embodiments describe that the zoom lens systems use the entire zooming region from the wide-end to the tele-end. However, it is unnecessary to use the entire zooming region. For example, the range where optical performance is ensured is selected according to a desired zooming region, and this range may be used as a zoom lens system. Specifically, the selected range may be used as a zoom lens system with lower power than the zoom lens systems described with reference to Numerical Examples 1 to 5 corresponding to the first to fifth exemplary embodiments.

As described above, the first to sixth exemplary embodiments have been described as examples of the technology disclosed in the present application.

However, the technology in the present disclosure is not limited to these, and can be applied to embodiments in which various changes, replacements, additions, omissions, or the like are made.

Numerical Examples for the configurations of the zoom lens systems according to the first to fifth exemplary embodiments will be described below with reference to FIGS. 2, 4, 6, 8, and 10.

In each Numerical Example, the units of length are all "mm", while the units of field angle are all "°". Moreover, in each Numerical Example, r is a radius of curvature, d is a surface interval, nd is a refractive index to the d-line, and vd is Abbe number to the d-line. In each Numerical Example, the surface marked with * is aspheric. The aspheric shape is defined by the following equation.

$$Z = \frac{h^2/r}{1+\sqrt{1-(1+\kappa)(h/r)^2}} + \sum A_n h^n \quad \text{[Equation 1]}$$

where Z is the distance from a point on the aspheric surface with height h from an optical axis to a tangent plane at the apex of the aspherical surface, h is the height from the optical axis, r is the curvature of radius at the apex, k is a conic constant, and $A_n$ is an n-order aspheric surface coefficient.

FIGS. 2, 4, 6, 8, and 10 are axial aberration diagrams of an infinity in-focus condition of the zoom lens systems according to Numerical Examples 1 to corresponding to the first to fifth exemplary embodiments.

In each axial aberration diagram, (a) shows the aberration at a wide-end, (b) shows the aberration at an intermediate position, and (c) shows the aberration at a tele-end. Each of the axial aberration diagrams (a) to (c) shows spherical aberration (SA (mm)), astigmatism (AST (mm)), and distortion (DIS (%)) in order from the left-hand side.

In each spherical aberration diagram, a vertical axis indicates F-number (indicated as F in each figure), and the solid line, the short dash line and the long dash line indicate the characteristics to the d-line, the F-line and the C-line, respectively. In each astigmatism diagram, the vertical axis indicates an image height (indicated as H in each figure), and the solid line and the dash line indicate characteristics to a sagittal plane (indicated as "s" in each figure) and a meridional plane (indicated as "m" in each figure), respectively. In each distortion diagram, the vertical axis indicates an image height (indicated as H in each figure).

NUMERICAL EXAMPLE 1

Numerical Example 1 corresponding to the zoom lens system according to the first exemplary embodiment illustrated in FIG. 1 will be described below.

| (Surface data) | | | | |
|---|---|---|---|---|
| Surface number | r | d | nd | vd |
| Object surface | ∞ | | | |
| 1 | 8.31150 | 0.23730 | 1.80518 | 25.5 |
| 2 | 5.74150 | 0.00170 | 1.56732 | 42.8 |
| 3 | 5.74150 | 1.05420 | 1.43700 | 95.1 |
| 4 | 48.19100 | 0.03390 | | |
| 5 | 6.56160 | 0.62350 | 1.43700 | 95.1 |
| 6 | 24.12580 | 0.03390 | | |
| 7 | 5.18040 | 0.66650 | 1.59282 | 68.6 |
| 8 | 15.70230 | Variable | | |
| 9 | 39.23470 | 0.11860 | 2.00100 | 29.1 |
| 10 | 2.18250 | 0.50410 | | |
| 11* | −6.27480 | 0.10170 | 1.88202 | 37.2 |
| 12* | 2.65550 | 0.01690 | | |
| 13 | 2.07980 | 0.64310 | 1.95906 | 17.5 |
| 14 | −5.43040 | 0.00170 | 1.56732 | 42.8 |
| 15 | −5.43040 | 0.08470 | 1.91082 | 35.2 |
| 16 | 2.31200 | Variable | | |
| 17* | 2.15820 | 0.36990 | 1.59201 | 67.0 |
| 18 | 5.37560 | 0.29470 | | |
| 19 (Diaphragm) | ∞ | Variable | | |
| 20* | 1.42620 | 0.79800 | 1.55332 | 71.7 |
| 21* | −61.46830 | 0.03390 | | |
| 22 | 6.53070 | 0.09730 | 2.00100 | 29.1 |
| 23 | 1.88860 | 0.00170 | 1.56732 | 42.8 |
| 24 | 1.88860 | 0.50090 | 1.49700 | 81.6 |
| 25 | −10.79050 | 0.03500 | | |
| 26* | 3.36020 | 0.17390 | 1.58699 | 59.5 |
| 27 | ∞ | Variable | | |
| 28 | −5.52720 | 0.08470 | 2.00100 | 29.1 |
| 29 | 2.08900 | Variable | | |
| 30 | 23.38070 | 0.23350 | 2.00272 | 19.3 |
| 31 | −3.47700 | 0.16950 | | |
| 32 | ∞ | 0.25420 | 1.51680 | 64.2 |
| 33 | ∞ | 0.67640 | | |
| 34 | ∞ | BF | | |
| Image plane | ∞ | | | |

(Aspheric surface data)

11th surface

K = 0.00000E+00, A4 = −2.28711E−02, A6 = 1.75042E−02,
A8 = −1.73984E−03

12th surface

K = 0.00000E+00, A4 = −2.06913E−02, A6 = 1.53652E−02,
A8 = 2.59599E−03

17th surface

K = 0.00000E+00, A4 = −9.36753E−03, A6 = −4.09252E−04,
A8 = −8.60255E−04

20th surface

K = 0.00000E+00, A4 = −2.09059E−02, A6 = −8.57122E−03,
A8 = −8.30917E−03

21st surface

K = 0.00000E+00, A4 = 4.83182E−03, A6 = −3.20287E−02,
A8 = 1.56850E−02

26th surface

K = 0.00000E+00, A4 = −6.57610E−02, A6 = −9.55406E−02,
A8 = 6.36764E−02

(Various data)
Zoom ratio 25.09940

|  | Wide | Intermediate | Tele |
|---|---|---|---|
| Focal length | 1.0002 | 5.0110 | 25.1039 |
| F-number | 1.60057 | 3.70212 | 4.40042 |
| Field angle | 35.6445 | 5.0883 | 1.0181 |
| Image height | 0.6730 | 0.4491 | 0.4491 |
| Overall length of lens system | 14.4994 | 14.4995 | 14.4995 |
| BF | 0.00000 | 0.00000 | 0.00000 |
| d8 | 0.1475 | 2.7058 | 4.1008 |
| d16 | 4.0379 | 1.4796 | 0.0847 |
| d19 | 1.6697 | 0.7046 | 0.1694 |
| d27 | 0.4510 | 0.9723 | 0.3294 |
| d29 | 0.3479 | 0.7918 | 1.9698 |
| Entrance pupil position | 4.6227 | 17.9427 | 56.1861 |
| Exit pupil position | −5.9378 | −6.7817 | −80.0524 |
| Front principal point position | 5.4545 | 19.2546 | 73.4165 |
| Back principal point position | 13.5022 | 9.4950 | −10.6154 |

(Single lens data)

| Lens | Initial surface | Focal length |
|---|---|---|
| 1 | 1 | −24.0516 |
| 2 | 3 | 14.8036 |
| 3 | 5 | 20.4041 |
| 4 | 7 | 12.7405 |
| 5 | 9 | −2.3124 |
| 6 | 11 | −2.1042 |
| 7 | 13 | 1.6366 |
| 8 | 15 | −1.7711 |
| 9 | 17 | 5.8412 |
| 10 | 20 | 2.5305 |
| 11 | 22 | −2.6824 |
| 12 | 24 | 3.2770 |
| 13 | 26 | 5.7245 |
| 14 | 28 | −1.5061 |
| 15 | 30 | 3.0318 |

(Zoom lens group data)

| Unit No. | Initial surface | Focal length | Length of lens group | Front principal point position | Back principal point position |
|---|---|---|---|---|---|
| 1 | 1 | 6.86927 | 2.65100 | 0.76214 | 1.59612 |
| 2 | 9 | −1.01579 | 1.47080 | 0.42276 | 1.03608 |
| 3 | 17 | 5.84118 | 0.66460 | −0.14947 | −0.00239 |
| 4 | 20 | 2.19562 | 1.64070 | 0.32213 | 0.75232 |
| 5 | 28 | −1.50612 | 0.08470 | 0.03055 | 0.07315 |
| 6 | 30 | 3.03184 | 0.65720 | 0.10194 | 0.30495 |

(Power of zoom lens group)

| Unit No. | Initial surface | Wide | Intermediate | Tele |
|---|---|---|---|---|
| 1 | 1 | 0.00000 | 0.00000 | 0.00000 |
| 2 | 9 | −0.24023 | −0.60824 | −3.69323 |
| 3 | 17 | 22.62253 | 2.39130 | 8.29862 |
| 4 | 20 | −0.01732 | −0.28795 | −0.05279 |
| 5 | 28 | 2.34451 | 2.64466 | 3.40031 |
| 6 | 30 | 0.65975 | 0.65858 | 0.66434 |

NUMERICAL EXAMPLE 2

Numerical Example 2 corresponding to the zoom lens system according to the second exemplary embodiment illustrated in FIG. 3 will be described below.

(Surface data)

| Surface number | r | d | nd | vd |
|---|---|---|---|---|
| Object surface | ∞ | | | |
| 1 | 15.57110 | 0.34880 | 1.80518 | 25.5 |
| 2 | 9.06690 | 0.00230 | 1.56732 | 42.8 |
| 3 | 9.06690 | 1.43630 | 1.43700 | 95.1 |
| 4 | −86.47200 | 0.04650 | | |
| 5 | 9.03450 | 0.89610 | 1.49700 | 81.6 |
| 6 | 43.75670 | 0.04650 | | |
| 7 | 6.56670 | 0.89370 | 1.59282 | 68.6 |
| 8 | 17.00800 | Variable | | |
| 9 | 10.15090 | 0.16280 | 2.00100 | 29.1 |
| 10 | 1.79950 | 0.88500 | | |
| 11* | −2.81570 | 0.13950 | 1.88202 | 37.2 |
| 12* | 7.62190 | 0.02330 | | |
| 13 | 2.70260 | 0.83830 | 1.95906 | 17.5 |
| 14 | −3.25500 | 0.00230 | 1.56732 | 42.8 |
| 15 | −3.25500 | 0.11630 | 2.00100 | 29.1 |
| 16 | 5.14930 | Variable | | |
| 17* | 3.07840 | 0.47560 | 1.59201 | 67.0 |
| 18 | 8.20610 | 0.36870 | | |
| 19 (Diaphragm) | ∞ | Variable | | |
| 20 | 2.03540 | 0.83720 | 1.55332 | 71.7 |
| 21* | 11.79320 | 0.04650 | | |
| 22 | 2.50860 | 0.12440 | 2.00100 | 29.1 |
| 23 | 1.39310 | 0.00230 | 1.56732 | 42.8 |
| 24 | 1.39310 | 0.94850 | 1.49700 | 81.6 |
| 25 | 5.41210 | 0.13560 | | |
| 26* | 3.66810 | 0.33790 | 1.51760 | 63.5 |
| 27* | −17.66740 | Variable | | |
| 28 | 9.75750 | 0.11630 | 1.80420 | 46.5 |
| 29 | 1.81400 | Variable | | |
| 30 | 8.08220 | 0.29430 | 1.64769 | 33.8 |
| 31 | −6.53970 | 0.23250 | | |
| 32 | ∞ | 0.34880 | 1.51680 | 64.2 |
| 33 | ∞ | 0.92810 | | |
| 34 | ∞ | BF | | |
| Image plane | ∞ | | | |

(Aspheric surface data)

11th surface

K = 0.00000E+00, A4 = 5.50611E−02, A6 = −2.06976E−02,
A8 = 4.42094E−03
12th surface K = 0.00000E+00, A4 = 6.23395E−02, A6 = −2.40079E−02,
A8 = 7.24415E−03
17th surface K = 0.00000E+00, A4 = −3.92440E−03, A6 = −8.27527E−05,
A8 = −2.36362E−05
21st surface K = 0.00000E+00, A4 = 1.48995E−02, A6 = −1.13438E−03,
A8 = 1.40729E−04
26th surface K = 0.00000E+00, A4 = −1.00576E−02, A6 = −3.04374E−02,
A8 = −8.77072E−03
27th surface

K = 0.00000E+00, A4 = 4.42561E−03, A6 = −3.21990E−02,
A8 = −1.17694E−03

(Various data)
Zoom ratio 35.99906

|  | Wide | Intermediate | Tele |
| --- | --- | --- | --- |
| Focal length | 1.0000 | 5.9997 | 35.9983 |
| F-number | 1.60055 | 3.60300 | 4.70479 |
| Field angle | 34.5980 | 6.5771 | 1.1156 |
| Image height | 0.7174 | 0.7174 | 0.7174 |
| Overall length of lens system | 19.8939 | 19.8939 | 19.8940 |
| BF | 0.00000 | 0.00000 | 0.00000 |
| d8 | 0.1080 | 3.7365 | 5.5587 |
| d16 | 5.5669 | 1.9383 | 0.1162 |
| d19 | 2.3532 | 0.8024 | 0.2325 |
| d27 | 0.3389 | 1.3393 | 0.3091 |
| d29 | 0.4925 | 1.0430 | 2.6431 |
| Entrance pupil position | 5.3987 | 24.3954 | 94.4557 |
| Exit pupil position | 8.1109 | −7.3658 | −16.1135 |
| Front principal point position | 6.2754 | 25.5105 | 49.9979 |
| Back principal point position | 18.8954 | 13.8977 | −16.1112 |

(Single lens data)

| Lens | Initial surface | Focal length |
| --- | --- | --- |
| 1 | 1 | −27.6188 |
| 2 | 3 | 18.8652 |
| 3 | 5 | 22.7134 |
| 4 | 7 | 17.4864 |
| 5 | 9 | −2.2066 |
| 6 | 11 | −2.3166 |
| 7 | 13 | 1.6535 |
| 8 | 15 | −1.9786 |
| 9 | 17 | 8.0442 |
| 10 | 20 | 4.3140 |
| 11 | 22 | −3.3147 |
| 12 | 24 | 3.5004 |
| 13 | 26 | 5.9003 |
| 14 | 28 | −2.7890 |
| 15 | 30 | 5.6256 |

(Zoom lens group data)

| Unit No. | Initial surface | Focal length | Length of lens group | Front principal point position | Back principal point position |
| --- | --- | --- | --- | --- | --- |
| 1 | 1 | 8.76224 | 3.67020 | 1.17069 | 2.37502 |
| 2 | 9 | −1.11977 | 2.16750 | 0.48052 | 1.33446 |
| 3 | 17 | 8.04416 | 0.84430 | −0.17337 | 0.01345 |
| 4 | 20 | 3.13836 | 2.43240 | 0.35163 | 0.97321 |
| 5 | 28 | −2.78897 | 0.11630 | 0.07970 | 0.13112 |
| 6 | 30 | 5.62557 | 0.87560 | 0.09952 | 0.33262 |

(Power of zoom lens group)

| Unit No. | Initial surface | Wide | Intermediate | Tele |
| --- | --- | --- | --- | --- |
| 1 | 1 | 0.00000 | 0.00000 | 0.00000 |
| 2 | 9 | −0.19445 | −0.52565 | −3.63481 |
| 3 | 17 | 16.75599 | 2.15211 | 3.87045 |
| 4 | 20 | −0.02468 | −0.38677 | −0.14688 |
| 5 | 28 | 1.92218 | 2.12092 | 2.68778 |
| 6 | 30 | 0.73823 | 0.73787 | 0.73973 |

NUMERICAL EXAMPLE 3

Numerical Example 3 corresponding to the zoom lens system according to the third exemplary embodiment illustrated in FIG. 5 will be described below.

(Surface data)

| Surface number | r | d | nd | vd |
| --- | --- | --- | --- | --- |
| Object surface | ∞ | | | |
| 1 | 9.27370 | 0.17230 | 1.80518 | 25.5 |
| 2 | 5.06750 | 0.00110 | 1.56732 | 42.8 |
| 3 | 5.06750 | 0.67340 | 1.43700 | 95.1 |
| 4 | −27.47840 | 0.02300 | | |
| 5 | 3.98400 | 0.57690 | 1.49700 | 81.6 |
| 6 | 16.66220 | 0.02300 | | |
| 7 | 3.03480 | 0.47100 | 1.59282 | 68.6 |
| 8 | 5.88820 | Variable | | |
| 9 | 3.32700 | 0.08040 | 2.00069 | 25.5 |
| 10 | 1.04280 | 0.47200 | | |
| 11* | −2.64940 | 0.06890 | 1.85135 | 40.1 |
| 12* | 7.50110 | 0.01150 | | |
| 13 | 3.04500 | 0.44870 | 1.95906 | 17.5 |
| 14 | −1.66620 | 0.00110 | 1.56732 | 42.8 |
| 15 | −1.66620 | 0.05740 | 1.88100 | 40.1 |
| 16 | 24.41510 | Variable | | |
| 17* | −2.70960 | 0.91660 | 1.59201 | 67.0 |
| 18 | −1.38930 | Variable | | |
| 19 (Diaphragm) | ∞ | 0.20180 | | |
| 20 | −4.75000 | 0.33460 | 1.49710 | 81.6 |
| 21* | −1.28410 | 0.02300 | | |
| 22 | −1.75760 | 0.08940 | 2.00100 | 29.1 |
| 23 | 2.56810 | 0.00110 | 1.56732 | 42.8 |
| 24 | 2.56810 | 1.11990 | 1.49700 | 81.6 |
| 25 | −1.44240 | 0.02300 | | |
| 26* | 3.56110 | 0.69150 | 1.73077 | 40.5 |
| 27* | −2.74790 | Variable | | |
| 28 | 3.09430 | 0.05740 | 1.81550 | 44.4 |
| 29 | 0.85990 | Variable | | |
| 30 | 1.25740 | 0.06990 | 2.00100 | 29.1 |
| 31 | 1.15900 | 0.17920 | | |
| 32 | ∞ | 0.17230 | 1.51680 | 64.2 |
| 33 | ∞ | 0.45830 | | |
| 34 | ∞ | BF | | |
| Image plane | ∞ | | | |

(Aspheric surface data)

11th surface

K = 0.00000E+00, A4 = 6.40725E−02, A6 = −3.02682E−02,
A8 = −1.29522E−02

12th surface

K = 0.00000E+00, A4 = 4.89393E−02, A6 = −1.27823E−02,
A8 = −2.79861E−02

17th surface

K = 0.00000E+00, A4 = −1.69700E−01, A6 = −5.46220E−03,
A8 = −1.32632E−01

21st surface

K = 0.00000E+00, A4 = 1.30869E−01, A6 = 0.00000E+00,
A8 = 0.00000E+00

26th surface

K = 0.00000E+00, A4 = 1.76394E−03, A6 = −2.20850E−03,
A8 = −4.28387E−04

27th surface

K = 0.00000E+00, A4 = 2.01845E−02, A6 = −7.59559E−03,
A8 = 8.54458E−04

(Various data)
Zoom ratio 19.99862

| | Wide | Intermediate | Tele |
|---|---|---|---|
| Focal length | 1.0002 | 4.4727 | 20.0029 |
| F-number | 1.60125 | 3.60835 | 4.70730 |
| Field angle | 18.5847 | 4.4258 | 0.9966 |
| Image height | 0.3543 | 0.3543 | 0.3543 |
| Overall length of lens system | 12.0589 | 12.0589 | 12.0589 |
| BF | 0.00000 | 0.00000 | 0.00000 |
| d8 | 0.0639 | 1.9037 | 2.5225 |
| d16 | 3.0712 | 1.2314 | 0.2657 |
| d18 | 0.1148 | 0.1148 | 0.4617 |
| d27 | 1.1360 | 1.0567 | 0.1019 |
| d29 | 0.2543 | 0.3336 | 1.2884 |
| Entrance pupil position | 3.8830 | 19.0312 | 53.7051 |
| Exit pupil position | −2.2851 | −2.3499 | −3.0995 |
| Front principal point position | 4.4446 | 14.9903 | −55.5931 |
| Back principal point position | 11.0548 | 7.5861 | −7.9490 |

(Single lens data)

| Lens | Initial surface | Focal length |
|---|---|---|
| 1 | 1 | −14.1342 |
| 2 | 3 | 9.8525 |
| 3 | 5 | 10.3783 |
| 4 | 7 | 9.9525 |
| 5 | 9 | −1.5450 |
| 6 | 11 | −2.2926 |
| 7 | 13 | 1.1778 |
| 8 | 15 | −1.7686 |
| 9 | 17 | 3.8279 |
| 10 | 20 | 3.4303 |
| 11 | 22 | −1.0317 |
| 12 | 24 | 2.0483 |
| 13 | 26 | 2.2251 |
| 14 | 28 | −1.4773 |
| 15 | 30 | −22.9514 |

(Zoom lens group data)

| Unit No. | Initial surface | Focal length | Length of lens group | Front principal point position | Back principal point position |
|---|---|---|---|---|---|
| 1 | 1 | 4.50461 | 1.94070 | 0.52508 | 1.18272 |
| 2 | 9 | −1.29143 | 1.14000 | 0.10425 | 0.42961 |
| 3 | 17 | 3.82790 | 0.91660 | 0.93914 | 1.39813 |
| 4 | 19 | 1.61318 | 2.48430 | 1.59840 | 2.94441 |
| 5 | 28 | −1.47729 | 0.05740 | 0.04430 | 0.06971 |
| 6 | 30 | −22.95143 | 0.42140 | 0.69245 | 0.76687 |

(Power of zoom lens group)

| Unit No. | Initial surface | Wide | Intermediate | Tele |
|---|---|---|---|---|
| 1 | 1 | 0.00000 | 0.00000 | 0.00000 |
| 2 | 9 | −0.56467 | −2.88756 | 7.52764 |
| 3 | 17 | −1.31385 | −0.93969 | 0.37011 |
| 4 | 19 | 0.17461 | 0.20665 | 0.65958 |
| 5 | 28 | 1.70594 | 1.76214 | 2.40519 |
| 6 | 30 | 1.00475 | 1.00491 | 1.00470 |

NUMERICAL EXAMPLE 4

Numerical Example 4 corresponding to the zoom lens system according to the fourth exemplary embodiment illustrated in FIG. 7 will be described below.

(Surface data)

| Surface number | r | d | nd | vd |
|---|---|---|---|---|
| Object surface | ∞ | | | |
| 1 | 14.11070 | 0.28910 | 1.80518 | 25.5 |
| 2 | 8.07810 | 0.00190 | 1.56732 | 42.8 |
| 3 | 8.07810 | 1.35540 | 1.43700 | 95.1 |
| 4 | −37.98350 | 0.03850 | | |
| 5 | 7.37060 | 0.87700 | 1.49700 | 81.6 |
| 6 | 39.31630 | 0.03850 | | |
| 7 | 5.01700 | 0.71920 | 1.59282 | 68.6 |
| 8 | 9.76490 | Variable | | |
| 9 | 4.24760 | 0.13490 | 2.00100 | 29.1 |
| 10 | 1.37580 | 0.84500 | | |
| 11* | −2.86120 | 0.11560 | 1.88202 | 37.2 |
| 12* | 3.85080 | 0.16090 | | |
| 13 | 2.74370 | 0.57430 | 1.95906 | 17.5 |
| 14 | −5.22740 | 0.00190 | 1.56732 | 42.8 |
| 15 | −5.22740 | 0.09640 | 2.00100 | 29.1 |
| 16 | 34.66620 | Variable | | |
| 17* | −34.01020 | 0.22720 | 1.92110 | 22.4 |
| 18 | −7.29460 | Variable | | |
| 19 (Diaphragm) | ∞ | 1.77890 | | |
| 20 | −39.76790 | 0.57810 | 1.49710 | 81.6 |
| 21* | −1.80080 | 0.13560 | | |
| 22 | −1.99050 | 0.51410 | 2.00100 | 29.1 |
| 23 | −18.72540 | 0.00190 | 1.56732 | 42.8 |
| 24 | −18.72540 | 0.79020 | 1.49700 | 81.6 |
| 25 | −2.56960 | 0.03850 | | |
| 26* | 5.63440 | 1.00960 | 1.54250 | 62.9 |
| 27* | −2.59790 | Variable | | |
| 28 | 22.60160 | 0.09640 | 2.00100 | 29.1 |
| 29 | 1.96880 | Variable | | |
| 30 | 2.96790 | 0.43490 | 1.95375 | 32.3 |
| 31 | −9.42430 | 0.19270 | | |
| 32 | ∞ | 0.28910 | 1.51680 | 64.2 |
| 33 | ∞ | 0.76910 | | |
| 34 | ∞ | BF | | |
| Image plane | ∞ | | | |

(Aspheric surface data)

11th surface

K = 0.00000E+00, A4 = 1.82423E−01, A6 = −2.00729E−01,
A8 = 7.28126E−02

12th surface

K = 0.00000E+00, A4 = 1.86271E−01, A6 = −2.11957E−01,
A8 = 8.53905E−02

17th surface

K = 0.00000E+00, A4 = 2.25659E−04, A6 = 5.10546E−05,
A8 = −1.41906E−04

21st surface

K = 0.00000E+00, A4 = 4.75226E−02, A6 = 0.00000E+00,
A8 = 0.00000E+00

26th surface

K = 0.00000E+00, A4 = 8.15082E−03, A6 = −1.36054E−03,
A8 = 2.17125E−04

27th surface

K = 0.00000E+00, A4 = 1.25417E−02, A6 = 8.97517E−04,
A8 = 1.31919E−04

(Various data)
Zoom ratio 31.00405

| | Wide | Intermediate | Tele |
|---|---|---|---|
| Focal length | 1.0000 | 5.5680 | 31.0050 |
| F-number | 1.60118 | 3.60470 | 4.70504 |
| Field angle | 28.5605 | 5.8016 | 1.0930 |
| Image height | 0.5945 | 0.5945 | 0.5945 |
| Overall length of lens system | 19.8515 | 19.8516 | 19.8516 |
| BF | 0.00000 | 0.00000 | 0.00000 |
| d8 | 0.0533 | 3.5641 | 4.6153 |
| d16 | 4.7896 | 0.8034 | 0.2277 |
| d18 | 0.1927 | 0.6681 | 0.1927 |
| d27 | 1.7408 | 2.2226 | 0.1528 |
| d29 | 0.9702 | 0.4885 | 2.5582 |
| Entrance pupil position | 5.0976 | 31.2946 | 92.5154 |
| Exit pupil position | 5.4810 | 7.7525 | 3.1387 |
| Front principal point position | 6.2802 | 40.8604 | 430.6642 |
| Back principal point position | 18.8524 | 14.2813 | −11.1445 |

(Single lens data)

| Lens | Initial surface | Focal length |
|---|---|---|
| 1 | 1 | −23.9797 |
| 2 | 3 | 15.3811 |
| 3 | 5 | 18.0871 |
| 4 | 7 | 16.4765 |
| 5 | 9 | −2.0818 |
| 6 | 11 | −1.8462 |
| 7 | 13 | 1.9447 |
| 8 | 15 | −4.5324 |
| 9 | 17 | 10.0409 |
| 10 | 20 | 3.7753 |
| 11 | 22 | −2.2598 |
| 12 | 24 | 5.8968 |
| 13 | 26 | 3.4253 |
| 14 | 28 | −2.1596 |
| 15 | 30 | 2.4078 |

(Zoom lens group data)

| Unit No. | Initial surface | Focal length | Length of lens group | Front principal point position | Back principal point position |
|---|---|---|---|---|---|
| 1 | 1 | 7.37320 | 3.31960 | 1.03617 | 2.13434 |
| 2 | 9 | −1.36275 | 1.92900 | 0.26014 | 0.73843 |
| 3 | 17 | 10.04089 | 0.22720 | 0.14995 | 0.25936 |
| 4 | 19 | 2.85911 | 4.84690 | 3.71903 | 4.96590 |
| 5 | 28 | −2.15955 | 0.09640 | 0.05290 | 0.10101 |
| 6 | 30 | 2.40780 | 0.91670 | 0.05424 | 0.36116 |

(Power of zoom lens group)

| Unit No. | Initial surface | Wide | Intermediate | Tele |
|---|---|---|---|---|
| 1 | 1 | 0.00000 | 0.00000 | 0.00000 |
| 2 | 9 | −0.30204 | −1.36145 | 27.12144 |
| 3 | 17 | 4.69989 | 2.14599 | 0.22784 |
| 4 | 19 | −0.07490 | −0.21989 | 0.42466 |
| 5 | 28 | 2.83786 | 2.60736 | 3.59153 |
| 6 | 30 | 0.44947 | 0.45083 | 0.44618 |

NUMERICAL EXAMPLE 5

Numerical Example 5 corresponding to the zoom lens system according to the fifth exemplary embodiment illustrated in FIG. 9 will be described below.

(Surface data)

| Surface number | r | d | nd | vd |
|---|---|---|---|---|
| Object surface | ∞ | | | |
| 1 | 14.14550 | 0.31790 | 1.80518 | 25.5 |
| 2 | 8.41530 | 0.00210 | 1.56732 | 42.8 |
| 3 | 8.41530 | 1.25810 | 1.43700 | 95.1 |
| 4 | −59.04800 | 0.04240 | | |
| 5 | 7.87340 | 0.93940 | 1.49700 | 81.6 |
| 6 | 42.28180 | 0.04240 | | |
| 7 | 5.78100 | 0.77760 | 1.59282 | 68.6 |
| 8 | 11.88730 | Variable | | |
| 9 | 5.66490 | 0.14830 | 2.00100 | 29.1 |
| 10 | 1.49040 | 0.94650 | | |
| 11* | −2.57330 | 0.12710 | 1.85135 | 40.1 |
| 12* | 5.77730 | 0.05900 | | |
| 13 | 2.74530 | 0.68700 | 1.95906 | 17.5 |
| 14 | −3.75500 | 0.00210 | 1.56732 | 42.8 |
| 15 | −3.75500 | 0.10600 | 2.00069 | 25.5 |
| 16 | 12.33820 | Variable | | |
| 17 (Diaphragm) | ∞ | Variable | | |
| 18 | 7.18360 | 0.61930 | 1.69895 | 30.0 |
| 19 | −5.89320 | 0.62300 | | |
| 20* | −2.90100 | 0.14330 | 2.01960 | 21.5 |
| 21 | −11.45960 | 0.00210 | 1.56732 | 42.8 |
| 22 | −11.45960 | 0.55920 | 1.49700 | 81.6 |
| 23 | −4.58390 | 0.04240 | | |
| 24* | 3.36460 | 1.30220 | 1.55332 | 71.7 |
| 25 | −2.56320 | Variable | | |
| 26 | 16.23690 | 0.13600 | 1.91082 | 35.2 |
| 27 | 7.14980 | Variable | | |
| 28 | 10.20010 | 0.10600 | 2.00069 | 25.5 |
| 29 | 1.86860 | Variable | | |
| 30 | 2.42880 | 0.50800 | 1.80610 | 33.3 |
| 31 | −13.93290 | 0.21190 | | |
| 32 | ∞ | 0.31790 | 1.51680 | 64.2 |
| 33 | ∞ | 0.84570 | | |
| 34 | ∞ | BF | | |
| Image plane | ∞ | | | |

-continued (Aspheric surface data)

11th surface

K = 0.00000E+00, A4 = 1.07881E-01, A6 = -8.27841E-02,
A8 = 2.39270E-02
12th surface K = 0.00000E+00, A4 = 1.10158E-01, A6 = -8.06112E-02,
A8 = 2.71140E-02
20th surface K = 0.00000E+00, A4 = 4.83931E-03, A6 = -1.81654E-03,
A8 = -2.86284E-04
24th surface K = 0.00000E+00, A4 = -1.75069E-02, A6 = 8.34652E-04,
A8 = 1.24945E-05
25th surface

K = 0.00000E+00, A4 = 1.35858E-02, A6 = -1.84514E-03,
A8 = 4.00263E-04

(Various data)
Zoom ratio 31.00328

| | Wide | Intermediate | Tele |
|---|---|---|---|
| Focal length | 1.0000 | 5.5680 | 31.0028 |
| F-number | 1.60107 | 3.60524 | 4.70659 |
| Field angle | 31.6538 | 6.4674 | 1.1958 |
| Image height | 0.6537 | 0.6537 | 0.6537 |
| Overall length of lens system | 20.1328 | 20.1328 | 20.1329 |
| BF | 0.00000 | 0.00000 | 0.00000 |
| d8 | 0.0545 | 3.4792 | 5.1538 |
| d16 | 5.3779 | 1.9533 | 0.2786 |
| d17 | 1.2829 | 0.3799 | 1.2829 |
| d25 | 0.2119 | 1.1148 | 0.2119 |
| d27 | 1.9398 | 1.8501 | 0.3294 |
| d29 | 0.3929 | 0.4826 | 2.0034 |
| Entrance pupil position | 5.1342 | 24.5907 | 99.3743 |
| Exit pupil position | -121.6885 | -24.1476 | 5.4726 |
| Front principal point position | 6.1260 | 28.8753 | 306.3407 |
| Back principal point position | 19.1346 | 14.5737 | -10.8597 |

(Single lens data)

| Lens | Initial surface | Focal length |
|---|---|---|
| 1 | 1 | -26.4549 |
| 2 | 3 | 16.9510 |
| 3 | 5 | 19.2921 |
| 4 | 7 | 18.1247 |
| 5 | 9 | -2.0570 |
| 6 | 11 | -2.0766 |
| 7 | 13 | 1.7438 |
| 8 | 15 | -2.8674 |
| 9 | 18 | 4.7238 |
| 10 | 20 | -3.8421 |
| 11 | 22 | 14.9680 |
| 12 | 24 | 2.8526 |
| 13 | 26 | -14.1270 |
| 14 | 28 | -2.3007 |
| 15 | 30 | 2.6018 |

(Zoom lens group data)

| Unit No. | Initial surface | Focal length | Length of lens group | Front principal point position | Back principal point position |
|---|---|---|---|---|---|
| 1 | 1 | 8.04620 | 3.37990 | 0.98145 | 2.10184 |
| 2 | 9 | -1.24354 | 2.07600 | 0.36467 | 1.02989 |
| 3 | 18 | 2.94405 | 3.29150 | 1.95177 | 2.38751 |
| 4 | 26 | -14.12695 | 0.13600 | 0.12809 | 0.19240 |
| 5 | 28 | -2.30075 | 0.10600 | 0.06528 | 0.11796 |
| 6 | 30 | 2.60182 | 1.03780 | 0.04234 | 0.37343 |

(Power of zoom lens group)

| Unit No. | Initial surface | Wide | Intermediate | Tele |
|---|---|---|---|---|
| 1 | 1 | 0.00000 | 0.00000 | 0.00000 |
| 2 | 9 | -0.24357 | -0.73988 | -202.97254 |
| 3 | 18 | -0.35638 | -0.64695 | -0.01153 |
| 4 | 26 | 1.24164 | 1.23648 | 1.13992 |
| 5 | 28 | 2.75264 | 2.80937 | 3.47353 |
| 6 | 30 | 0.41891 | 0.41617 | 0.41569 |

The zoom lens systems according to the first to fifth exemplary embodiments are implemented with numerical values in Numerical Examples 1 to 5.

The values corresponding to conditional expressions (1) to (3) described above in Numerical Examples 1 to 5 are shown below in Table 1.

TABLE 1

| | Numerical example | | | | |
|---|---|---|---|---|---|
| Condition | 1 | 2 | 3 | 4 | 5 |
| (1) M5/La | 0.1119 | 0.1081 | 0.0858 | 0.0800 | 0.0800 |
| (2) \| M5/f5 \| | 1.0769 | 0.7711 | 0.7000 | 0.7353 | 0.7000 |
| (3) n | 2.00100 | 1.80420 | 1.81550 | 2.00100 | 2.00069 |

It is understood from Table 1 that the zoom lens systems implemented with the numerical values in Numerical Examples 1 to 5 satisfy the above conditional expressions (1) to (3).

It is found from the above that a zoom lens system which is compact, has high power, and is in excellent in focusing performance in the entire zooming range, and a camera system including the zoom lens system can be implemented.

The above exemplary embodiments have been described to exemplify the technology according to the present disclosure, and therefore, various modifications, replacements, additions, and omissions may be made within the scope of the claims and the scope of the equivalents thereof.

What is claimed is:

1. A zoom lens system comprising a plurality of lens groups that includes, in order from an object side to an image plane side:

a first lens group having positive optical power;

a second lens group having negative optical power;

a third lens group having positive optical power; and a subsequent lens group including three lens groups which are a fourth lens group, a fifth lens group, and a sixth lens group, wherein:

the first lens group includes, in order from the object side to the image plane side, a first lens element having negative optical power, a second lens element having positive optical power, a third lens element having positive optical power, and a fourth lens element having positive optical power, the fifth lens group in the subsequent lens group has negative optical power, a position of the first lens group is fixed with respect to the image plane in zooming from a wide-end to a tele-end upon image shooting, and a conditional expression of $$0.62 < |Z5/f5| < 50$$

is satisfied, where a moving amount of the fifth lens group in zooming from a wide-end to a tele-end is defined as Z5, and a focal length of the fifth lens group is defined as f5.

2. The zoom lens system according to claim 1, wherein the fifth lens group is moving with respect to the image plane in zooming.

3. The zoom lens system according to claim 1, wherein a conditional expression of $$0.075 < M5/La < 0.300$$

is satisfied, where a moving amount of the fifth lens group toward the object side in zooming from a wide-end to a tele-end is defined as M5, and an overall length of the lens system is defined as La.

4. The zoom lens system according to claim 1, comprising: an aperture diaphragm,
wherein one or more lens groups moving along an optical axis in zooming from a wide-end to a tele-end upon image shooting are disposed each side of object side and image plane side of the aperture diaphragm.

5. The zoom lens system according to claim 4, wherein a position of the aperture diaphragm is fixed with respect to the image plane in zooming from a wide-end to a tele-end.

6. The zoom lens system according to claim 1, wherein a position of the sixth lens group located closest to the image plane out of the subsequent lens group is fixed with respect to the image plane in zooming from a wide-end to a tele-end.

7. The zoom lens system according to claim 1, wherein the fifth lens group consist of a single lens element, and moves toward the image plane side in focusing from an infinity in-focus condition to a close-object in-focus condition to perform focusing.

8. The zoom lens system according to claim 1, comprising a lens element having negative optical power in the fifth lens group, the lens element satisfying a conditional expression of $$1.75 < n \leq 2.1$$

where a refractive index of the lens element to a d-line is defined as n.

9. The zoom lens system according to claim 1, wherein the fourth lens group and the fifth lens group in the subsequent lens group move toward the object side so as to decrease a space between the fourth lens group and the fifth lens group at a tele-end with respect to a wide-end, in zooming from the wide-end to the tele-end.

10. The zoom lens system according to claim 1, wherein, in zooming from a wide-end to a tele-end, the fourth lens group in the subsequent lens group is fixed with respect to the image plane, and the fifth lens group moves closer to the image plane side and then moves away from the image plane side.

11. A camera system comprising:
the zoom lens system according to claim 1; and
an imaging element that receives an optical image formed by the zoom lens system.

* * * * *